(12) United States Patent
Bontu et al.

(10) Patent No.: US 10,897,334 B2
(45) Date of Patent: Jan. 19, 2021

(54) REFERENCE SIGNAL CONFIGURATION FOR CELL COORDINATION

(71) Applicant: Telefonaktiebolaget LM Ericsson (publ), Stockholm (SE)

(72) Inventors: Chandra Sekhar Bontu, Nepean (CA); Girum Alebachew Fantaye, Ottawa (CA); Mercy George, Kanata (CA); Jianguo Long, Kanata (CA); Hua Xu, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/754,603

(22) PCT Filed: Aug. 31, 2015

(86) PCT No.: PCT/IB2015/056614
§ 371 (c)(1),
(2) Date: Feb. 23, 2018

(87) PCT Pub. No.: WO2017/037505
PCT Pub. Date: Mar. 9, 2017

(65) Prior Publication Data
US 2018/0254864 A1    Sep. 6, 2018

(51) Int. Cl.
*H04L 5/00* (2006.01)
*H04B 7/024* (2017.01)
(Continued)

(52) U.S. Cl.
CPC ........... *H04L 5/0035* (2013.01); *H04B 7/024* (2013.01); *H04B 7/0417* (2013.01); *H04L 5/005* (2013.01);
(Continued)

(58) Field of Classification Search
CPC ..... H04L 5/0035; H04L 5/005; H04L 5/0044; H04L 5/0057; H04W 72/04; H04W 16/24; H04W 16/00; H04B 7/0417; H04B 7/024
See application file for complete search history.

(56) References Cited

U.S. PATENT DOCUMENTS 8,923,203 B2    12/2014  Fong et al.
8,995,293 B2    3/2015   Jongren et al.
(Continued)

FOREIGN PATENT DOCUMENTS

EP    2 800 437 A1    11/2014
EP    2 800 438 A1    11/2014
(Continued)

OTHER PUBLICATIONS

3GPP TS 36.211 V11.6.0 (Sep. 2014) 3rd Generation Partnership Project; Technical Specification Group Radio Access Network; Evolved Universal Terrestrial Radio Access (E-UTRA); Physical channels and modulation (Release 11) Sep. 26, 2014 120-pages.
(Continued)

*Primary Examiner* — Ian N Moore
*Assistant Examiner* — Rushil Parimal Sampat
(74) *Attorney, Agent, or Firm* — Christopher & Weisberg, P.A.

(57) ABSTRACT

A node including processing circuitry including a processor, and a memory, the memory containing instructions that, when executed by the processor, configure the processor to: determine a cluster of a plurality of cells, assign at least one ZP CSI-RS configuration to each of the plurality of cells of the cluster, assign to each cell in the plurality of cells of the cluster a respective NZP CSI-RS configuration in which each of the NZP CSI-RS configurations assigned to respective cells in the cluster partially overlapping the at least one
(Continued)

ZP CSI-RS configuration, and cause a first cell of the plurality of cells of the cluster to transmit, within a subframe, based on the at least one ZP CSI-RS configuration and the NZP CSI-RS configuration assigned to the first cell.

18 Claims, 13 Drawing Sheets

(51) Int. Cl.
  *H04B 7/0417* (2017.01)
  *H04W 16/24* (2009.01)
  *H04W 72/04* (2009.01)

(52) U.S. Cl.
  CPC .......... *H04L 5/0044* (2013.01); *H04L 5/0057* (2013.01); *H04W 16/24* (2013.01); *H04W 72/04* (2013.01)

(56) References Cited

U.S. PATENT DOCUMENTS

| | | | |
|---|---|---|---|
| 10,050,756 B2 * | 8/2018 | Park | H04L 25/0204 |
| 2013/0114430 A1 * | 5/2013 | Koivisto | H04B 7/024 |
| | | | 370/252 |
| 2013/0242778 A1 | 9/2013 | Geirhofer et al. | |
| 2014/0126496 A1 | 5/2014 | Sayana et al. | |
| 2014/0153526 A1 | 6/2014 | Mazzarese | |

FOREIGN PATENT DOCUMENTS

| | | |
|---|---|---|
| EP | 2 903 174 A1 | 8/2015 |
| WO | 2013064190 A1 | 5/2013 |
| WO | 2013172760 A1 | 11/2013 |

OTHER PUBLICATIONS

3GPP TS 36.213 V11.9.0 (Dec. 2014) 3rd Generation Partnership Project; Technical Specification Group Radio Access Network; Evolved Universal Terrestrial Radio Access (E-UTRA); Physical Layer Procedures (Release 11) Jan. 6, 2015 consisting of 182-pages.
3GPP TSG-RAN WG3 Meeting #87bis, R3-150723, "Discussion on Number of CSI Processes for Inter eNB CoMP," Source: Ericsson, Agenda Item: 11.1, Document for Approval, Conference Location and Date: Tenerife, Spain, Apr. 20-24, 2015 consisting of 7-pages.
International Search Report and Written Opinion of the International Searching Authority dated May 20, 2016 in corresponding PCT Application Serial No. PCT/IB2015/056614 and consisting of 13-pages.

* cited by examiner

REFERENCE SIGNAL CONFIGURATION FOR CELL COORDINATION

CROSS-REFERENCE TO RELATED APPLICATIONS

This application is a Submission Under 35 U.S.C. § 371 for U.S. National Stage Patent Application of International Application Number: PCT/IB2015/056614, filed Aug. 31, 2015 entitled "REFERENCE SIGNAL CONFIGURATION FOR CELL COORDINATION" which is incorporated herein by reference.

TECHNICAL FIELD

The present disclosure relates to a method and system for wireless communications, and in particular to a cell specific channel state information reference signal (CSI-RS) configuration for assisting in scheduling downlink resources.

BACKGROUND

As demand for wireless devices continues to surge, Long Term Evolution (LTE) and LTE-Advanced continue to evolve with a focus on providing higher capacity by increasing peak data rates, spectral efficiency, improving performance at cell edges and increasing the number of active subscribers that are simultaneously supported. One way LTE-Advanced strives to achieve high capacity is by supporting enhanced use of multi-antenna techniques such as Multiple Input Multiple Output (MIMO) or Beam Forming (BF). MIMO is used to increase the overall bitrate through simultaneous transmission, using two or more different antennas, of two or more different information signals on the same radio resources to be received by one (single user) or more (multi-user) receivers using two or more antennas. In the case of BF, the same information is precoded and transmitted by more than one antenna towards the intended receiver. A precoding vector of the precoding is adapted such that most of the transmitted power is directed towards the intended receiver. These multi-antenna transmission techniques combined with cell coordination further enhance the overall network capacity and coverage. In cell coordination, the downlink (DL) and uplink (UL) transmissions across a cluster of cells are scheduled such that the inter-cell interference is controlled and the transmission from or to a wireless device is scheduled from an appropriate cell within the cluster to maximize the signal to interference ratio. DL as used herein refers to transmissions from a cell to a wireless device, and UL as used herein refers to transmissions from the wireless device to a cell.

In order to be able to adjust the type of multi-antenna transmission scheme, a number of different Transmission Modes (TM) have been defined. For example, 3GPP LTE-Advanced in release 10, TM 9 was introduced to combine the advantages of high spectral efficiency, e.g., support up to 8-layer single user (SU) MIMO and multi-user (MU) MIMO, and cell-edge data rates (Beam Forming) on the downlink (DL). TM 9 also supports dynamic switching between SU MIMO and MU MIMO. Further, channel state information (CSI) reference signals (RS) are introduced to assist the connected wireless devices to measure the CSI and feedback CSI information to the network node. Using the CSI-RS, data can be transmitted on more than four independent layers (up to eight independent layers) unlike in the case of cell-specific reference symbols (CRS), where the number of independent layers are limited to four. The RS overhead due to the inclusion of CSI-RS is less than the overhead due to cell-specific reference symbols (CRS). Typically the overhead due to CSI-RS per physical resource block (PRB) is one resource element (RE) per antenna port per subframe. CSI-RS configuration is dependent on the number of transmit antenna ports. For example, there are two, four and eight REs per PRB for one or two, four and eight transmit antenna ports respectively, as defined in 3GPP Technical Specification 36.211 v10.5.0.

In TM 9, each cell can configure one non-zero power (NZP) CSI-RS and one zero power (ZP) CSI-RS per carrier. In particular, CSI reference signal configuration is mapped to (k', l') for normal cyclic prefix as defined in 3GPP TS 36.211. Table 1 illustrates this mapping. Here k' and l' identify the RE within a PRB pair in which k' is the frequency index and l' is the orthogonal frequency-division multiplexing (OFDM) symbol index. Also, $n_s$ indicates the slot number within the PRB pair.

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |

TABLE 1-continued

|  | | Number of CSI reference signals configured | | | | | |
|---|---|---|---|---|---|---|---|
|  | CSI reference signal | 1 or 2 | | 4 | | 8 | |
|  | configuration | (k', l') | $n_s$ mod 2 | (k', l') | $n_s$ mod 2 | (k', l') | $n_s$ mod 2 |
| Frame structure type 2 only | 20 | (11, 1) | 1 | (11, 1) | 1 | (11, 1) | 1 |
|  | 21 | (9, 1) | 1 | (9, 1) | 1 | (9, 1) | 1 |
|  | 22 | (7, 1) | 1 | (7, 1) | 1 | (7, 1) | 1 |
|  | 23 | (10, 1) | 1 | (10, 1) | 1 | | |
|  | 24 | (8, 1) | 1 | (8, 1) | 1 | | |
|  | 25 | (6, 1) | 1 | (6, 1) | 1 | | |
|  | 26 | (5, 1) | 1 | | | | |
|  | 27 | (4, 1) | 1 | | | | |
|  | 28 | (3, 1) | 1 | | | | |
|  | 29 | (2, 1) | 1 | | | | |
|  | 30 | (1, 1) | 1 | | | | |
|  | 31 | (0, 1) | 1 | | | | |

In subframes configured for CSI-RS transmission, the reference signal sequence $r_{l,n_s}(m)$, as defined in 6.10.5.1 of 3GPP TS 36.211, is mapped to complex-valued modulation symbols $a_{k,l}^{(p)}$ used as reference symbols on antenna port p according to $$a_{k,l}^{(p)} = w_{l''} \cdot r_{l,n_s}(m')$$

where $a_{k,l}^{(p)}$ represents the complex valued modulation symbol corresponding to the $k^{th}$ frequency index, $l^{th}$ OFDM symbol in a subframe transmitted on antenna port p. Several variables are defined below.

$$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \\ -0 & \text{for } p \in \{15, 16\}, \text{extended cyclic prefix} \\ -3 & \text{for } p \in \{17, 18\}, \text{extended cyclic prefix} \\ -6 & \text{for } p \in \{19, 20\}, \text{extended cyclic prefix} \\ -9 & \text{for } p \in \{21, 22\}, \text{extended cyclic prefix} \end{cases}$$

$$l = l' + \begin{cases} l'' & CSI \text{ reference signal configurations 0-19, normal cyclic prefix} \\ 2l'' & CSI \text{ reference signal configurations 20-31, normal cyclic prefix} \\ l'' & CSI \text{ reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The ZP CSI-RS configurations for which the wireless device assumes zero transmission power in a subframe are given by a bitmap. For each bit set to one in the 16-bit bitmap, the wireless device shall assume zero transmission power for the resource elements corresponding to the four CSI reference signal column in Table 1 for a normal cyclic prefix, except for resource elements that overlap with those for which the wireless device shall assume non-zero transmission power CSI-RS. The most significant bit corresponds to the lowest CSI reference signal configuration index and subsequent bits in the bitmap correspond to configurations with indices in increasing order.

In TM 9, each cell can configure one NZP CSI-RS and one ZP CSI-RS per carrier. The wireless device reports one CSI report per carrier. Therefore, in existing systems, there is very limited feedback from a TM 9 wireless device to assist in DL cell coordination.

SUMMARY

The present disclosure advantageously provides method(s), node(s) and system(s) for providing cell coordination for wireless communications. In particular, a cell specific channel state information reference signal (CSI-RS) configuration is provided to assist in scheduling downlink radio resources.

In one embodiment of the disclosure, a node for managing cell coordination is provided. The node includes processing circuitry including a processor and a memory, the memory containing instructions that, when executed by the processor, configure the processor to determine a cluster of a plurality of cells, the cluster of the plurality of cells having a plurality of antennas and assign at least one zero power channel state information reference signal, ZP CSI-RS, configuration to each of the plurality of cells of the cluster. The memory further contains instructions that, when executed by the processor, configure the processor to assign to each cell in the plurality of cells of the cluster a respective non-zero power channel state information reference signal, NZP CSI-RS, configuration, each of the NZP CSI-RS configurations assigned to respective cells in the cluster partially overlapping the at least one ZP CSI-RS configuration. The memory further contains instructions that, when executed by the processor, configure the processor to cause a first cell of the plurality of cells of the cluster to transmit, within a subframe, based on the at least one ZP CSI-RS configuration and the NZP CSI-RS configuration assigned to the first cell.

According to one embodiment of this aspect, the at least one ZP CSI-RS configuration is a plurality of ZP CSI-RS configurations, each of the plurality of ZP CSI-RS configurations corresponds to a total number of antennas every N cells of the cluster, where N is not greater than two. According to another embodiment of this aspect, the respective NZP CSI-RS configurations are determined based on a number of antennas of the respective cell that is being assigned the NZP CSI-RS configuration. According to another embodiment of this aspect, radio resources assigned to the respective NZP CSI-RS configurations do not overlap each other.

According to another embodiment of this aspect, a composite NZP CSI-RS configuration of each of the respective NZP CSI-RS configurations of the plurality of cells of the cluster corresponds to the total number of antennas of the cluster. According to another embodiment of this aspect, at least one of the at least one ZP CSI-RS configuration is selected for assignment at random from a plurality of ZP CSI-RS configurations. According to another embodiment of this aspect, the memory contains further instructions that, when executed by the processor, configure the processor to receive at least one CSI report associated with a first wireless device in communication with at least one cell of the plurality of cells in the cluster. The at least one CSI report is based at least in part on the transmission according to the at least one ZP CSI-RS configuration and the NZP CSI-RS configuration assigned to the first cell. The memory further contains instructions that, when executed by the processor, configure the processor to schedule radio resources for downlink transmission to the first wireless device based at least in part on the received at least one CSI report.

According to another embodiment of this aspect, the memory contains further instructions that, when executed by the processor, configure the processor to receive at least one uplink signal associated with the first wireless device in communication with at least one of the plurality of cells in the cluster, determine at least one uplink signal quality of the at least one uplink signal, and select cells of the plurality of cells of the cluster for downlink transmission to the first wireless device based on the determined at least one uplink signal quality of the at least one uplink signal. The scheduling of radio resources for downlink transmission to the first wireless device includes scheduling of radio resources on one of the selected cell of the plurality of cells of the cluster while muting corresponding radio resources at the other selected cells of the plurality of cells of the cluster. According to another embodiment of this aspect, the memory contains further instructions that, when executed by the processor, configure the processor to receive at least one uplink signal associated with the first wireless device in communication with at least one of the plurality of cells in the cluster, determine at least one uplink signal quality of the at least one uplink signal, and select cells of the plurality of cells of the cluster for downlink transmission to the first wireless device based on the determined at least one uplink signal quality of the at least one uplink signal. The scheduling of radio resources for downlink transmission to the first wireless device includes scheduling of radio resources on all the selected cells of the plurality of cells of the cluster.

According to another embodiment of the disclosure, a method for managing cell coordination is provided. A cluster of a plurality of cells is determined in which the cluster of the plurality of cells has a plurality of antennas. At least one zero power channel state information reference signal, ZP CSI-RS, configuration is assigned to each of the plurality of cells of the cluster. The assigned at least one ZP CSI-RS configuration corresponds to a total number of antennas in the cluster. Each cell in the plurality of cells of the cluster is assigned a respective non-zero power channel state information reference signal, NZP CSI-RS, configuration. Each of the NZP CSI-RS configurations assigned to respective cells in the cluster partially overlap the at least one ZP CSI-RS configuration. A first cell of the plurality of cells of the cluster is caused to transmit, within a subframe, based on the at least one ZP CSI-RS configuration and the NZP CSI-RS configuration assigned to the first cell.

According to another aspect of this embodiment, the at least one ZP CSI-RS configuration includes a plurality of ZP CSI-RS configurations. Each of the plurality of ZP CSI-RS configurations correspond to a total number of antennas every N cells of the cluster, where N is not greater than two. According to another aspect of this embodiment, the respective NZP CSI-RS configurations are determined based on a number of antennas of the respective cell that is being assigned the NZP CSI-RS configuration. According to another aspect of this embodiment, radio resources assigned to the respective NZP CSI-RS configurations do not overlap each other.

According to another aspect of this embodiment, a composite NZP CSI-RS configuration of each of the respective NZP CSI-RS configurations of the plurality of cells of the cluster corresponds to the total number of antennas of the cluster. According to another aspect of this embodiment, at least one of the at least one ZP CSI-RS configuration is selected for assignment at random from a plurality of possible ZP CSI-RS configurations. According to another aspect of this embodiment, at least one CSI report associated with a first wireless device in communication with at least one cell of the plurality of cells in the cluster is received. The at least one CSI report is based at least in part on the transmission according to the at least one ZP CSI-RS configuration and the NZP CSI-RS configuration assigned to the first cell. Radio resources are selected for downlink transmission to the first wireless device based at least in part on the received at least one CSI report.

According to another aspect of this embodiment, at least one uplink signal associated with the first wireless device in communication with at least one of the plurality of cells in the cluster is received. At least one uplink signal quality of the at least one uplink signal is determined. Cells of the plurality of cells of the cluster are selected for downlink transmission to the first wireless device based on the determined at least one uplink signal quality of the at least one uplink signal. The scheduling of radio resources for downlink transmission to the first wireless device includes the scheduling of radio resources on one of the selected cells of the plurality of cells of the cluster while muting corresponding radio resources at the other selected cells of the plurality of cells of the cluster. According to another aspect of this embodiment, at least one uplink signal associated with the first wireless device in communication with at least one of the plurality of cells in the cluster is received. At least one uplink signal quality of the at least one uplink signal is determined. At least two cells of the plurality of cells of the cluster are selected for downlink transmission to the first wireless device based on the determined at least one uplink signal quality of the at least one uplink signal. The scheduling of radio resources for downlink transmission to the first wireless device includes the scheduling of radio resources on all the selected cells of the plurality of cells of the cluster.

According to another embodiment of the disclosure, a node for managing cell coordination is provided. The node includes processing circuitry including a processor, and a memory, the memory containing instructions that, when executed by the processor, configure the processor to cause a first cell of a plurality of cells of a cluster to transmit, within a subframe, based on a ZP CSI-RS configuration and a NZP CSI-RS configuration that are assigned to the first cell, and receive at least one CSI report associated with a first wireless device in communication with at least one cell of the plurality of cells of the cluster. The at least one CSI report is based at least in part on the transmission based on the ZP CSI-RS configuration and NZP CSI-RS configuration. The memory contains further instructions that, when executed by the processor, configure the processor to schedule radio resources for downlink transmission to the first wireless device based at least in part on the received at least one CSI report.

According to another aspect of this embodiment, the memory contains further instructions that, when executed by the processor, configure the processor to receive at least one uplink signal associated with the first wireless device in communication with at least one of the plurality of cells in the cluster, determine at least one uplink signal quality of the at least one uplink signal, and select cells of the plurality of cells of the cluster for downlink transmission to the first wireless device based on the determined at least one uplink signal quality of the at least one uplink signal. The scheduling of radio resources for downlink transmission to the first wireless device includes the scheduling of radio resources on one of the selected cells of the plurality of cells of the cluster while muting corresponding radio resources at the other selected cells of the plurality of cells of the cluster.

According to another aspect of this embodiment, the memory contains further instructions that, when executed by the processor, configure the processor to receive at least one uplink signal associated with the first wireless device in communication with at least one of the plurality of cells in the cluster, determine at least one uplink signal quality of the at least one uplink signal, and select cells of the plurality of cells of the cluster for downlink transmission to the first wireless device based on the determined at least one uplink signal quality of the at least one uplink signal. The scheduling of radio resources for downlink transmission to the first wireless device includes the scheduling of radio resources on all the selected cells of the plurality of cells of the cluster.

According to another embodiment of the disclosure, a method for managing cell coordination is provided. A first cell of a plurality of cells of a cluster is caused to transmit, within a subframe, based on a ZP CSI-RS configuration and a NZP CSI-RS configuration that are assigned to the first cell. At least one CSI report associated with a first wireless device in communication with at least one cell of the plurality of cells of the cluster is received. The at least one CSI report is based at least in part on the transmission based on the ZP CSI-RS configuration and NZP CSI-RS configuration. Radio resources are scheduled for downlink transmission to the first wireless device based at least in part on the received at least one CSI report.

According to another aspect of this embodiment, at least one uplink signal associated with the first wireless device in communication with at least one of the plurality of cells in the cluster is received. At least one uplink signal quality of the at least one uplink signal is determined. Cells of the plurality of cells of the cluster are selected for downlink transmission to the first wireless device based on the determined at least one uplink signal quality of the at least one uplink signal. The scheduling of radio resources for downlink transmission to the first wireless device includes the scheduling of radio resources on one of the selected cells of the plurality of cells of the cluster while muting corresponding radio resources at the other selected cells of the plurality of cells of the cluster.

According to another aspect of this embodiment, at least one uplink signal associated with the first wireless device in communication with at least one of the plurality of cells in the cluster is received. At least one uplink signal quality of the at least one uplink signal is determined. At least two cells of the plurality of cells of the cluster are selected for downlink transmission to the first wireless device based on the determined at least one uplink signal quality of the at least one uplink signal. The scheduling of radio resources for downlink transmission to the first wireless device includes the scheduling of radio resources on all the selected cells of the plurality of cells of the cluster.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Figure 1:
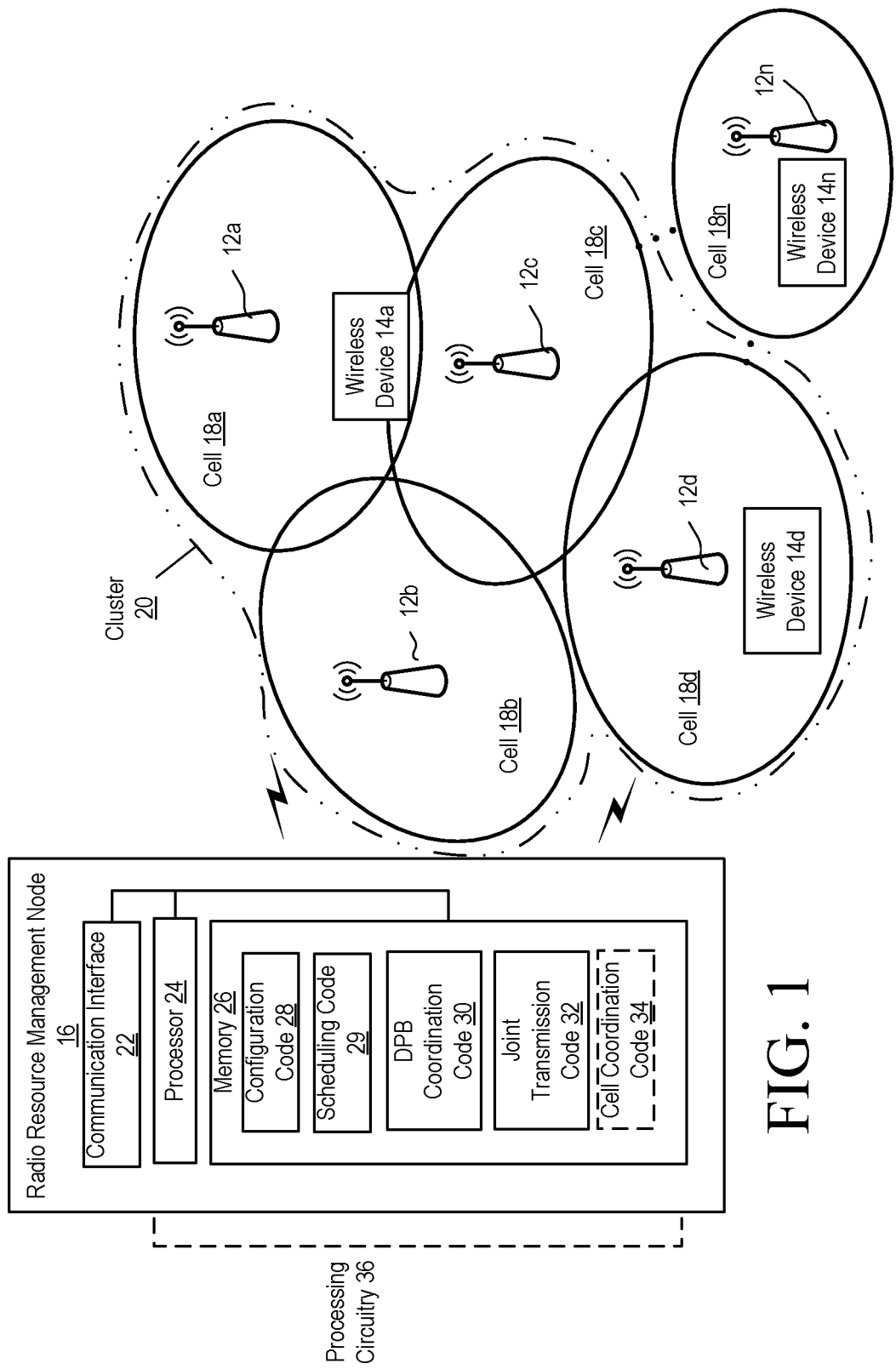
FIG. 1 is a block diagram of an exemplary system for cell specific CSI-RS configuration for cell coordination in accordance with the principles of the disclosure.

The method(s), node(s) and system(s) described herein advantageously provide cell coordination for wireless communications. In particular, a cell specific channel state information reference signal (CSI-RS) configuration is provided to assist in scheduling downlink radio resources. For example, configuration of the CSI-RS for cell coordination assists in cell selection for the upcoming DL transmission for a connected wireless device, and corresponding link transmission parameters selection for the wireless device. DL as used herein refers to transmissions from a cell to a wireless device, and UL as used herein refers to transmissions from the wireless device to a cell.

Coordination using TM9 CSI-RS is achieved by configuring the CSI-RS for cell coordination as described in this disclosure. For example, for TM 9, the non-zero power (NZP) CSI-RS configuration at each coordinating cell can be configured such that they are transmitted on orthogonal radio resources, i.e., radio resources used to transmit a signal from a respective transmission port are not used to transmit any signal by other transmission ports in the same transmission time interval (TTI) and vice versa (no overlap), to a NZP CSI-RS configuration(s) of the other coordinating cell(s) of the cluster. Each cell can identify other coordinating cells as the cells which are dominant interferers to a connected wireless device. Similarly, the zero power (ZP) CSI-RS configuration at each cell is selected such that a wireless device does not experience interference from the other coordinating cells while measuring the CSI.

Therefore, the cell specific CSI-RS configuration provides coordination capability to TM9 wireless devices with minimal CSI-RS overhead. This type of CSI-RS configuration allows the wireless device to report CSI that represents the achievable signal to interference plus noise ratio (SINR) with respect to one of the coordinating cells. For example, signal power measured is with respect to one of the coordinating cells and the interference includes the signals received from cells that do not belong to the coordinating cell cluster. In one or more embodiments, an iterative CSI-RS assignment technique for CSI-RS assignment for the cells within a cluster is provided. Further, the assigned CSI-RS for a TM 9 capable wireless device assists in scheduling downlink transmissions.

Before describing in detail exemplary embodiments that are in accordance with the disclosure, it is noted that the embodiments reside primarily in combinations of apparatus/node components and processing steps related to providing cell coordination. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for cell-specific CSI-RS configuration for cell coordination in accordance with the principles of the disclosure and designated generally as "10." System 10 includes one or more nodes 12a-12n (hereinafter collectively referred to as node 12), one or more wireless devices 14a-14n (hereinafter collectively referred to as wireless device 14) and one or more radio resource management (RRM) nodes 16, among other nodes, devices and entities. In one or more embodiments, node 12 is an eNodeB (eNB), base station, radio base station, base transceiver station, relay node, remote radio unit (RRU) remote radio head (RRH), access point, among other types of nodes known in the art. While each node 12 is illustrated as providing a respective cell/sector coverage area (cell 18), each node 12 may provide one or more cells 18a-18n (hereinafter collectively referred to as cell 18) or sectors. Irrespective of how each cell 18 is provided, each cell 18 is associated with a respective number of antennas, e.g., transmit antennas. As illustrated in FIG. 1, cells 18a-18d form cluster 20. However, in one or more embodiments, system 10 includes more or fewer clusters 20 than illustrated in FIG. 1, and cluster 20 includes more or less cells 18 than illustrated in FIG. 1. Coordinating cells 18 refer to multiple transmit points, e.g., cells, nodes, etc., that coordinate downlink and/or uplink transmissions to/from a connected wireless device 14.

One or more wireless devices 14 are in communication with one or more nodes 12. Wireless device 14 may be a radio communication device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

RRM node 16 includes one or more communication interfaces 22 for communicating with one or more nodes 12 and one or more wireless devices 14. RRM node 16 includes one or more processors 24 for performing RRM node 16 functions described herein. RRM node 16 includes memory 26 that is configured to store code such as configuration code 28, scheduling code 29, dynamic point blocking (DPB) coordination code 30, joint transmission code 32 and/or cell coordination code 34. For example, configuration code 28 includes instructions which, when executed by processor 24, cause processor 24 to perform the configuration process discussed in detail with respect to FIG. 2. In other words, configuration code 28 is directed to configuring cell specific CSI-RS signal(s). In another example, configuration code 28 includes instructions which when executed by processor 24, cause processor 24 to perform another configuration process as discussed in detail with respect to FIG. 4. In another example, scheduling code 29 includes instructions, which when executed by processor 24, cause processor 24 to perform the scheduling process, discussed in detail with respect to FIG. 6. Scheduling code 29 is directed to scheduling downlink transmission to wireless device 14 based on CSI report(s) triggered by the CSI-RS configuration(s) and at least one of the plurality of cells 18.

Figure 7:
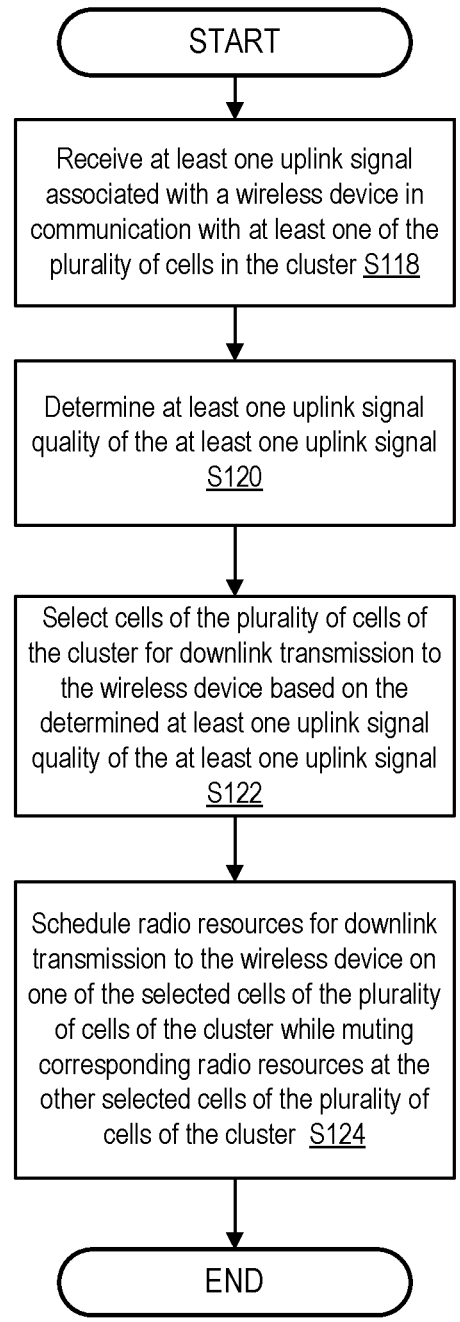
FIG. 7 is a flow diagram of an exemplary dynamic point blocking coordination process in accordance with the principles of the disclosure.

In another example, DPB coordination code 30 includes instructions, which when executed by processor 24, cause processor 24 to perform the DPB coordination process, discussed in detail with respect to FIG. 7. DPB coordination code 30 is directed to a dynamic point blocking process for scheduling radio resources for wireless device 14 on only one cell 18 based on a highest uplink received power as discussed herein. In another embodiment, DPB coordination code 30 includes instructions, which when executed by processor 24, cause processor 24 to perform another DPB coordination process, discussed in detail with respect to FIG. 10.

Figure 8:
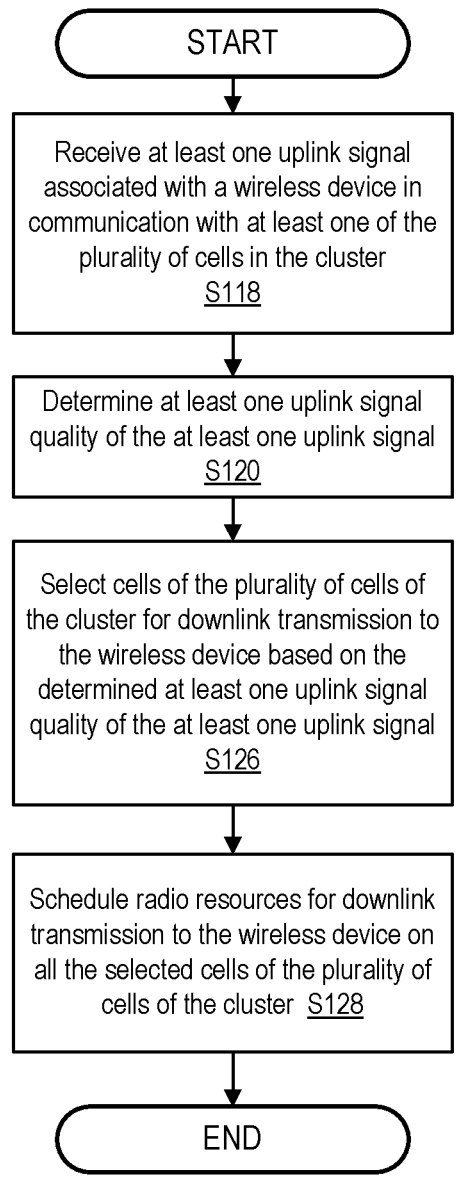
FIG. 8 is a flow diagram of an exemplary joint transmission process in accordance with the principles of the disclosure.

In another example, joint transmission code 32 includes instructions, which when executed by processor 24, cause processor 24 to perform the joint transmission process, discussed in detail with respect to FIG. 8. In other words, joint transmission code 32 is directed to scheduling the same radio resources for wireless device 14 on one or more coordinating cells 18. In another example, joint transmission code 32 includes instructions, which when executed by processor 24, causes processor 24 to perform another joint transmission process, discussed in detail with respect to FIG. 11. In yet another example, cell coordination code 34 includes instructions, which when executed by processor 24, cause processor 24 to perform the cell coordination process, discussed in detail with respect to FIG. 9. Cell coordination code 34 relates to the process involving CSI-RS configuration, cell selection and scheduling of radio resources to wireless device 14 based on the CSI-RS configuration and selected cells 18. In one or more embodiment, one or more of codes 28, 30, 32 and 34 may be omitted based on design need, and/or one or more blocks may be performed in a different order than illustrated in FIGS. 2, 4 and 6-11.

In one or more embodiments, processor 24 and memory 26 form processing circuitry 36 containing instructions which, when executed configure processor 24 to perform the one or more functions described with respect to FIGS. 2, 4 and 6-11. In addition to a traditional processor and memory, processing circuitry 36 may comprise integrated circuitry for processing and/or control, e.g., one or more processors and/or processor cores and/or FPGAs (Field Programmable Gate Array) and/or ASICs (Application Specific Integrated Circuitry). Processing circuitry 36 may comprise and/or be connected to and/or be adapted for accessing (e.g., writing to and/or reading from) memory 26, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 26 may be adapted to store code executable by control circuitry and/or other data, e.g., data pertaining to communication, e.g., configuration and/or address data of nodes, etc. Processing circuitry 36 may be adapted to control any of the methods described herein and/or to cause such methods to be performed, e.g., by node 16. Corresponding instructions may be stored in the memory 26, which may be readable and/or readably connected to the processing circuitry 36. In other words, processing circuitry 36 may include a controller, which may comprise a microprocessor and/or microcontroller and/or FPGA (Field-Programmable Gate Array) device and/or ASIC (Application Specific Integrated Circuit) device. It may be considered that processing circuitry 36 includes or may be connected or connectable to memory, which may be adapted to be accessible for reading and/or writing by the controller and/or processing circuitry 36.

While RRM node 16 is shown as a separate element from node 12, in one or more embodiments RRM node 16 and node 12 may be the same element, node 12 may include functions of RRM node 16, and/or RRM node 16 may include functions of node 12. Memory 26 may include non-volatile and/or volatile memory. For example, non-volatile memory may include a hard drive, flash memory, programmable integrated circuits, memory stick, solid state memory and the like. Also, volatile memory may include random access memory and others known in the art. In one or more embodiments, memory 26 is any suitable tangible computer readable medium that may be utilized including hard disks, CD-ROMs, electronic storage devices, optical storage devices, or magnetic storage devices.

Figure 2:
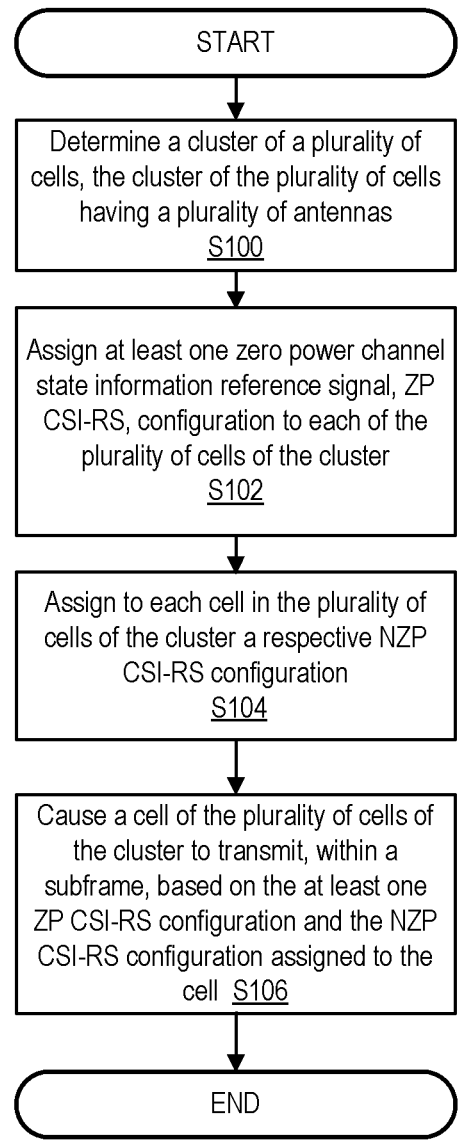
FIG. 2 is a flow diagram of an exemplary configuration process in accordance with the principles of the disclosure.

FIG. 2 is a flow diagram of an exemplary configuration process for configuring cell specific CSI-RS(s). In one or more embodiments the configuration process is embodied as configuration code 28. Processing circuitry 36 determines a first cluster 20 of a plurality of cells 18 (Block S100). The first cluster 20 of the plurality of cells 18 has a plurality of antennas. In one example illustrated in FIG. 1, processing circuitry 36 determines cluster 20 including cells 18a-18d in which cluster 20 has a plurality of antennas corresponding to antennas of cell 18a-18d. Processing circuitry 36 assigns at least one ZP CSI-RS configuration corresponding to at least a total number of antennas in the cluster 20 to each of the plurality of cells of the first cluster (Block S102). For example, in one embodiment where cells 18a-18d each have two antennas, cells 18a-18d are assigned two ZP CSI-RS configurations that correspond to eight antennas of cluster 20 even though individual cells 18 have two antennas. In other words, a composite ZP CSI-RS configuration including the two ZP CSI-RS configurations corresponds to a total number of antennas of the cluster. Further, in this example, each of the two ZP CSI-RS configurations correspond to a four port ZP CSI-RS configuration in which radio resources assigned to each ZP CSI-RS configuration do not overlap. Assignment of individual ZP CSI-RS configurations is discussed in detail below. One of ordinary skill in the art will recognize that one or more cells 18 may have a different number of antennas than other cells 18 in the same cluster 20 such that the ZP CSI-RS configuration may vary based on the number of antennas as discussed below.

In one or more embodiments, assignment of the ZP CSI-RS configuration is as follows. A unique CSI-RS ID corresponding to 4 transmit antennas, B is configured per every N cells within cluster 20, where N=2 if $(L_{TX} \geq 2)$ otherwise N=1. $L_{TX}$ represents the number of transmit antennas (or the "number of CSI reference signals configured" from Table 1) per coordinating cell 18. A number of independent CSI-RS IDs, specifically $$\left\lceil \frac{N_C}{N} \right\rceil$$

number of independent configurations, corresponding to 4 transmit antennas are obtained to form a composite ZP CSI-RS configuration. Equation 1 for B is as follows:

$$B(i), i = 0, 1, \ldots, \left\lceil \frac{N_C}{N} \right\rceil - 1 \quad \text{(Equation 1)}$$

where Nc is the number of coordinating cells 18 in cluster 20. ⌈x⌉ represents the smallest integer not less than x. The composite ZP CSI-RS at each cell 18 in cluster 20 is C, where Equation 2 for C is:

$$C = \bigcup_{i=0}^{\left\lceil \frac{N_C}{N} \right\rceil - 1} B(i) \quad \text{(Equation 2)}$$

$\bigcup_i x_i$ represents the union of all the sets $x_i$.

C is assigned as the ZP CSI-RS for all the cells within the cluster.

In one example, cluster 20 includes two cells 18, cells 18*b* and 18*d*, where each cell 18 has two antennas. Therefore, $L_{TX}$=2, Nc=2 and N=2 such that one ZP CSI-RS configuration, B(0), is assigned to cells 18*b* and 18*d*. In one or more embodiments, the selection of B(0) or the four port ZP CSI-RS configuration ID is made at random from a plurality of four port ZP CSI-RS configuration IDs by processing circuitry 36. Various ZP CSI-RS configurations are illustrated in Table 1. Another example where cluster 20 includes four cells 18 is described below with reference to FIG. 3. In this example, $N_c$=4, $L_{TX}$=2. Since $L_{TX}$=2, N will be set to 2. Therefore, as specified in Equation (1), there will be $$\left\lceil \frac{N_C}{N} \right\rceil = 2 \text{ independent } CSI\text{-}RS \text{ } IDs$$

corresponding to 4 transmit antennas (or number of CSI reference signals=4 in Table 1). As shown FIG. 3, the two CSI-RS IDs corresponding to 4 transmit antennas picked are 3 and 8. Therefore, the ZP CSI-RS configuration, i.e., composite ZP CSI-RS configuration, consists of two CSI-RS IDs {3, 8}. These CSI-RS IDs correspond to a four transmit antennas, in other words, these CSI-RS IDs correspond to the column in Table 1, tagged as "number of CSI reference signals configured" as 4. As specified in 3GPP TS 36.211, the higher layers are configured such that ZP CSI-RS as a bit map is "0001000010000000" and is included in the RRC connection reconfiguration message that is transmitted to wireless device 14. The first '0' in the bit map (i.e. "0001000010000000") corresponds to the CSI reference signal configuration of '0' in Table 1. As indicated in the bitmap, the bitmap consists of a '1' corresponding to CSI reference signal configurations '3' and '8'.

Processing circuitry 36 assigns each cell 18 in the plurality of cells 18 of cluster 20 a respective NZP CSI-RS configuration (Block S104). In one or more embodiments, respective NZP CSI-RS configurations for each cell 18 are determined based on a number of antennas of the respective cell 18 being assigned the NZP CSI-RS configuration. For example, assuming cells 18*a*-18*d* of cluster 20 illustrated in FIG. 1 each have two antennas, then cell 18*a* is assigned a first NZP CSI-RS configuration, cell 18*b* is assigned a second NZP CSI-RS configuration, cell 18*c* is assigned a third NZP CSI-RS configuration and cell 18*d* is assigned a fourth NZP CSI-RS configuration. The first, second, third and fourth NZP CSI-RS configurations are different from each other; therefore, cells 18*a*-18*d* in cluster 20 are assigned respective NZP CSI-RS configurations that do not overlap, i.e., are resource orthogonal. The radio resources, over which the NZP CSI-RS signals from cells 18*a* are transmitted, do not overlap with the radio resources over which NZP CSI-RS signals from cells 18*b*, 18*c* and 18*d*. Further, a composite NZP CSI-RS configuration of each of the respective NZP CSI-RS configurations of the plurality of cells 18 of cluster 20 corresponds to the total number of antennas of the cluster 20.

In one or more embodiments, assignment of the NZP CSI-RS configuration is as follows. A unique CSI-RS ID is assigned to each cell 18, i.e., coordinating cell, in cluster 20 such that radio resources or REs of the NZP CSI-RS configuration at least partially overlap with REs of the ZP CSI-RS configuration(s), i.e., composite ZP CSI-RS configuration, C, as defined in Equation (2), corresponding to the total number of antennas of cluster 20. As illustrated below, A(j), the number of unique CSI-RS IDs for NZP CSI-RS is as follows:

$$A(j), j=0,1,\ldots,N_C-1; A(l) \neq A(m) \text{ for } l \neq m \quad \text{(Equation 3)}$$

Figure 3:
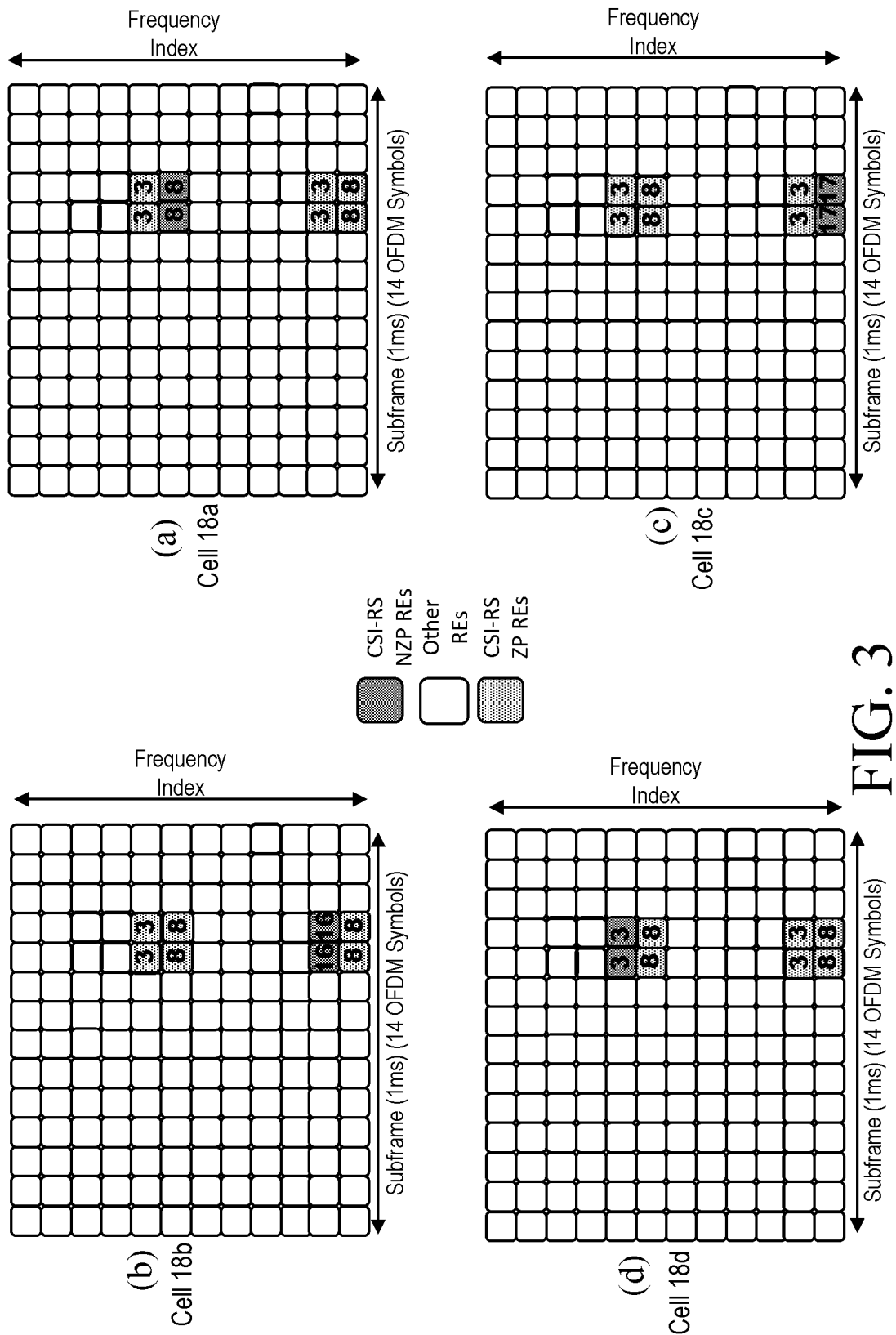
FIG. 3 is a block diagram of one example of radio resources after the CSI-RS configuration process in accordance with the principles of the disclosure.

In one example, cluster 20 includes cells 18*a*-18*d* in which each cell 18 includes two antennas. Therefore, Nc=4 such that four NZP CSI-RS configurations, A(0), A(1), A(2) and A(3), are assigned to cells 18 in the cluster, i.e., cell 18*a* is assigned A(0), cell 18*b* is assigned to A(1), cell 18*c* is assigned A(2) and cell 18*d* is assigned configuration A(3), where A(0)-A(3) each correspond to a respective two port NZP CSI-RS configuration. The radio resources for the NZP CSI-RS configuration are selected to at least partially overlap or collide with the radio resources for the ZP CSI-RS configuration(s) corresponding to the total number of antennas of cluster 20, as is described in detail with respect to FIG. 4. Referring to FIG. 3, A(0), A(1), A(2) and A(3) are set to CSI-RS IDs (or CSI reference signal configuration in Table 1) '8', '16', '17' and '3' respectively. These CSI-RS IDs correspond to a two transmit antennas (i.e., column corresponding to "number of CSI reference signals configured" as 2). From Table 1 and the equations associated with Table 1 discussed herein, the resource elements for A(0)-A(3) can be shown to partially overlap with the resource elements for the composite ZP CSI-RS configuration C.

Processing circuitry 36 causes cell 18 of the plurality of cells 18 of cluster 20 to transmit, within a subframe, according to both the at least one ZP CSI-RS configuration (assigned at Block S102) and the NZP CSI-RS configuration (assigned at Block S104) that were assigned to cell 18 (Block S106). One example of the resultant CSI-RS configuration of the configuration process is discussed in detail with respect to FIG. 3. The CSI-RS configuration for each cell 18 advantageously provides coordination capability to TM9 wireless devices 14 with minimal CSI-RS overhead. Further, the CSI-RS configuration at each cell 18 advantageously prevents wireless device 14 within cluster 20 from experiencing interference from the other coordinating cells 18 of cluster 20 while measuring the CSI. For example, the CSI-RS configuration of cell 18*a* of cluster 20 advantageously prevents wireless device 14*a* from experiencing interference from other coordinating cells 18*b*-18*d* while measuring the CSI. Therefore, the CSI measured over the NZP CSI-RS reference symbols by wireless device 14 is a faithful representation of a SINR without interference from coordinating cells 18.

Wireless device 14 receives the transmitted CSI-RS configuration(s)/signal(s) and determines CSI for transmission settings related to multi-antenna configuration, scheduling, etc., which are subsequently reported back, via CSI report(s), to RRM node 16 via node 12, or directly back to RRM node 16 if node 12 functionality is implemented in RRM node 16. The CSI report may include channel quality indication (CQI), precoder matrix indication (PMI) and rank indication (RI) that reflect the spatial, temporal and frequency correlation characteristics of the radio channel between each cell 18 or transmit point and wireless device 14. In a codebook based precoding, wireless device 14 evaluates the detected signal quality from all the predefined precoding vectors and picks the precoding vector which maximizes the detected signal quality. Corresponding rank and CQI along with the selected PMI are reported back to the serving cell 18 via the CSI reports. In one or more embodiments, a gain factor is added to the reported CQI for link adaptation. The gain factor may be estimated from UL measurements.

The exact set of resource elements, i.e., radio resources, out of a maximum of forty different resource elements within a physical resource block (PRB) pair that may be assigned CSI reference signals varies depending on CSI-RS configuration. In other words, a CSI-RS configuration corresponds to a predefined total amount of resource element(s) or radio resources in a physical resource block (PRB) in which the specific resource elements used are based on the specific CSI-RS configuration. For example, if the CSI-RS configuration consists of one or two "CSI reference signals configured" from Table 1, the CSI-RS would consist of two reference signals transmitted on two resource elements in each PRB pair across the carrier bandwidth. With a maximum of forty REs allocated in a PRB pair, in the case of one or two CSI-RS signals configured, there is a possibility for 20 different CSI-RS configurations in a resource-block pair.

In another example, if the CSI-RS configuration consists of four or eight "CSI-reference signals configured" from Table 1 that correspond to four or eight transmit antennas, the CSI-RS resources may be pair-wise frequency multiplexed as specified in Table 6.105.2-1 of 3GPP TS 36.211. In the case of four/eight CSI-RS signals that are configured there are ten/five different CSI-RS configurations respectively.

FIG. 3 illustrates configured radio resources after the CSI-RS configuration process of FIG. 2, at each cell 18 of clusters 20, where each cell 18 has two antennas. In particular, segments (a)-(d) of FIG. 3 illustrate the assignment of ZP CSI-RS configurations to cluster 20 as discussed in Block S102. For example, $L_{TX}=2$, Nc=4 and N=2 such that a ZP CSI-RS configuration is assigned every two cells, e.g., ZP CSI-RS configuration of B(0) is assigned to cells 18*b* and 18*d* while ZP CSI-RS configuration B(1) is assigned to cells 18*a* and 18*c*. B(0) and B(1) each correspond to respective four port ZP CSI-RS configurations IDs. In one or more embodiments of this example, the selection of B(0) or the four port ZP CSI-RS configuration ID is made at random from a plurality of four port ZP CSI-RS configuration IDs by processing circuitry 36.

In the example of FIG. 3, cells 18*a*-18*d* of cluster 20*a* are each assigned ZP CSI-RS IDs 3 and 8, i.e., four port CSI-RS ID 3 and 8. Therefore, the composite ZP CSI-RS configuration for both four port ZP CSI-RS IDs 3 and 8. While FIG. 3 illustrates unique ZP CSI-RS IDs 3 and 8, one of ordinary skill in the art will understand that other unique ZP CSI-RS IDs may be selected and assigned to respective clusters.

Further each cell 18*a*-18*d* is assigned a respective NZP CSI-RS configuration. In one or more embodiments, each of the NZP CSI-RS configurations is chosen such that REs partially overlap the REs of ZP CSI-RS configuration(s) while REs are mutually orthogonal or non-overlapping to each other. In the example illustrated in FIG. 3, cell 18*a* is assigned an NZP CSI-RS configuration corresponding to NZP CSI-RS configuration ID 8, cell 18*b* is assigned an NZP CSI-RS configuration corresponding to NZP CSI-RS configuration ID 16, cell 18*c* is assigned an NZP CSI-RS configuration corresponding to NZP CSI-RS configuration ID 17, and cell 18*d* is assigned an NZP CSI-RS configuration corresponding to NZP CSI-RS configuration ID 3. In these examples, the configuration ID corresponds to "8" in the "CSI reference signal Configuration" column of Table 1. NZP CSI-RS configurations partially overlap at least one of the assigned ZP CSI-RS configurations at each cell, and partially overlap the composite ZP CSI-RS configuration of cluster 20, as illustrated in segments (a)-(d). For example, cell 18*b* is assigned NZP CSI-RS configuration ID 16 that partially overlaps ZP CSI-RS configuration ID 3 as illustrated in FIG. 3. In another example, cell 18*a* is assigned NZP CSI-RS configuration ID 8 that partially overlaps ZP CSI-RS configuration ID 8 as illustrated in FIG. 3. In yet another example, cell 18*c* is assigned NZP CSI-RS configuration ID 17 that partially overlaps ZP CSI-RS configuration ID 8 as illustrated in FIG. 3. In yet another example, cell 18*d* is assigned NZP CSI-RS configuration ID 3 that partially overlaps ZP CSI-RS configuration ID 3 as illustrated in FIG. 3.

The corresponding resource elements within a physical resource block (PRB) may be derived by (k', l') and "$n_s$ mod 2" defined in the corresponding column for "number of CSI reference signals configured" for 2 in Table 1. The OFDM symbol index, l, and the subcarrier index, k, are described above. While FIG. 3 illustrates unique NZP CSI-RS IDs 8, 16, 3 and 17, one of ordinary skill in the art will understand that other unique CSI-RS IDs may be selected and assigned to respective cells 18.

In one or more embodiments, the following process is used to configure CSI-RS for cell-coordination that is optimized for lower overhead, i.e., fewer number of CSI-RS REs, and provides wireless device 14 CSI that does not include interference from the other cells 18 within cluster 20. For L transmit antenna ports:

a) Set J=1;
b) Assign a CSI-RS for the ith cell within a cluster by selecting one of the CSI-RS configuration IDs from Table 1. The first CSI-RS selection may be made at random. The configuration ID corresponds to 0-9 corresponding to "4" in "CSI reference signal Configuration" column of Table 1. This resource is tagged as {B(j), j=0, . . . , J−1}.
c) Find/determine multiple independent CSI-RS resources corresponding to L transmit antennas, {A(i), i=0, . . . P−1}, such that the resources of the found CSI-RS resources partially or completely overlap with the previously assigned resource {B(j), j=0, . . . J−1}.
d) The assigned CSI-RS resources, {A(i), i=0, . . . , P−1} and {B(j), j=0, . . . , J−1} are tagged as used CSI-RS resources for the subsequent assignments.
e) If P is less than the number of coordinating cells with the cluster, N, increment J by 1 and repeat steps b) to d).
f) Continue the above steps until all the cells in the coordinating set are assigned the CSI-RS resources A(i) or until the CSI-RS resources are exhausted.

In one example, A(i) corresponds to NZP CSI-RS configuration(s) of the ith cell and {B(j), j=0, . . . j−1} correspond to the composite ZP CSI-RS configuration(s). In one or more embodiments, one or more conditions are imposed on the selection of NZP CSI-RS configuration(s) and/or ZP CSI-RS configuration(s). In one condition, assuming previously configured CSI-RS reference symbols are on REs on ith subcarrier within a PRB, where the number the subcarriers within a PRB are numbered from 0 to 11, and i is an odd number, then a new set of CSI-RS symbols will not be assigned on REs on subcarrier (i+1) on the same set of OFDM symbols as the previous CSI-RS assignment. In another condition, if i is an even number, then a new set of CSI-RS symbols will not be assigned on REs on subcarrier (i−1) on the same set of OFDM symbols (i.e. two OFDM symbols) as the previous CSI-RS assignment. In yet another condition, the CSI-RS symbols on each set of OFDM symbols should occupy an even number of subcarriers within a PRB. In yet another condition, when CSI-RS symbols are assigned on more than one set of OFDM symbols and the CSI-RS symbols on one set of OFDM symbols occupy odd number of subcarriers within a PRB, the number of REs for non-CSI-RS symbols is maximized. While these one or more conditions are not required for CSI-RS configuration, these one or more conditions increase the efficiency of the process and allocation of radio resources.

The above conditions ensure that in a situation where transmit diversity is used as "fallback" transmission to extend the coverage, the number of REs allocated for transmitting data are maximized. In transmit diversity mode, the same pair of data symbols are transmitted on two adjacent subcarriers (i.e., two REs which are separated by smallest subcarrier spacing allowed) on two or more transmit antennas at a given time. For example, data symbols $d_0$ and $d^*_1$ are transmitted on subcarrier-i from transmit antennas 0 and 1 respectively. Then data symbols $d_1$ and $-d^*_0$ are transmitted on subcarrier-(i+1) from transmit antennas 0 and 1 respectively. Here the subscript * represents the complex conjugate operation. The subcarriers over which the two transmissions carry the data symbol pairs should not be separated by more than one subcarrier for successful detection at wireless device 14. There should be even number of subcarriers in a PRB for supporting transmit diversity. If there are odd number of subcarriers in a PRB, wireless device 14 ignores the OFDM symbol, thus causing less data throughput. The above conditions ensure that the data symbol pairs are separated at most by one subcarrier and that the number of subcarriers in an OFDM symbol is even.

Figure 4:
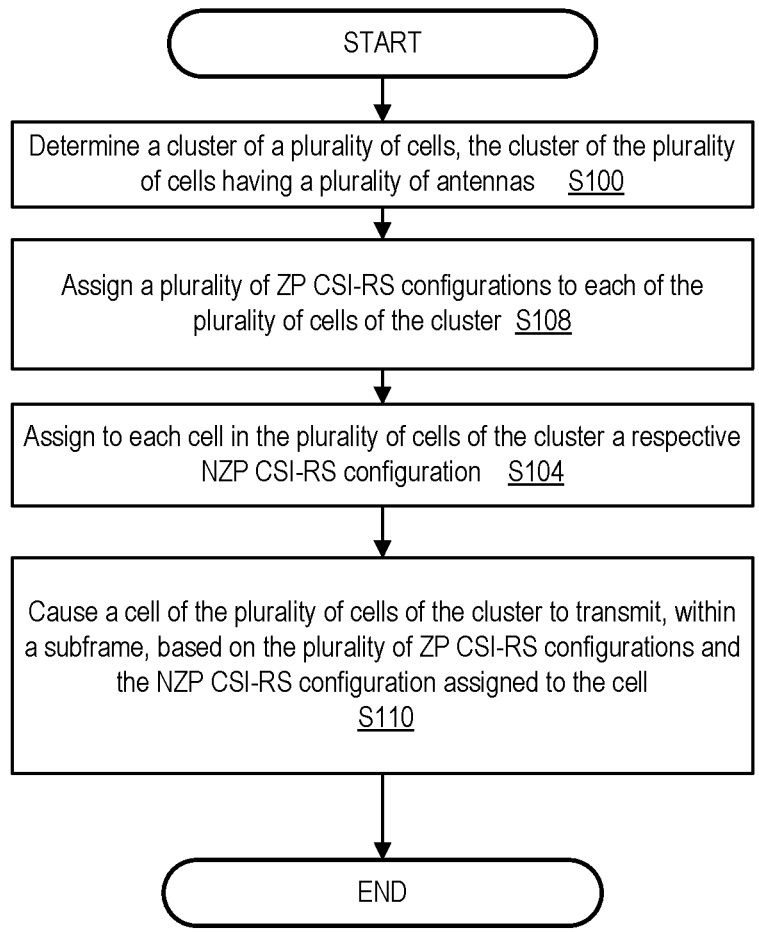
FIG. 4 is a flow diagram of another exemplary configuration process in accordance with the principles of the disclosure.

FIG. 4 illustrates another configuration process in which reference will be made to configured radio resources illustrated in FIGS. 3 and 5. In one or more embodiments, the other configuration process is embodied in configuration code 28. Cluster 20 includes cells 18a-18d and each cell has two antennas in this example. Processing circuitry 36 determines a cluster 20 of a plurality of cells 18, where cluster 20 of the plurality of cells 18 has a plurality of antennas as discussed in detail with respect to FIG. 2 (Block S100). Processing circuitry 36 assigns a plurality of ZP CSI-RS configurations to each of the plurality of cells 18 of the cluster 20 (Block S108). For example, as discussed above, the number of ZP CSI-RS configurations to be assigned to the cluster is determined using Equations 1 and 2. In this example, $L_{TX}$=2, Nc=4 and N=2 such that a ZP CSI-RS configuration is assigned every two cells, e.g., ZP CSI-RS configuration consisting of CSI-RS IDs B(0) and B(1) is assigned to cells 18a to 18d. B(0) and B(1) each correspond to respective four port ZP CSI-RS configurations ID. In other words, the ZP CSI-RS configuration(s), i.e., composite ZP CSI-RS configuration made up of a plurality of ZP CSI-RS configurations, is the same for all cells 18 within cluster 20.

Processing circuitry 36 assigns each cell 18 in the plurality of cells 18 of the cluster 20 a respective NZP CSI-RS configuration as discussed above with respect to FIG. 2 (Block S104). One example of the assignment in Block S104 is discussed with reference to FIG. 3 in which cell 18a is assigned a two port NZP CSI-RS configuration ID 8 in which this NZP CSI-RS configuration partially overlap with ZP CSI-RS configuration ID 8. In another example of the assignment in Block S104 is discussed with reference to FIG. 3 in which cell 18b is assigned a two port NZP CSI-RS configuration ID 16 in which this NZP CSI-RS configuration partially overlap with ZP CSI-RS configuration ID 3. In yet another example of the assignment in Block S104 is discussed with reference to FIG. 3 in which cell 18c is assigned a two port NZP CSI-RS configuration ID 17 in which this NZP CSI-RS configuration partially overlap with ZP CSI-RS configuration ID 8. In yet another example of the assignment in Block S104 is discussed with reference to FIG. 3 in which cell 18d is assigned a two port NZP CSI-RS configuration ID 3 in which this NZP CSI-RS configuration partially overlap with ZP CSI-RS configuration ID 3.

Processing circuitry 36 causes a cell 18 of the plurality of cells 18 of the cluster 20 to transmit, within a subframe, according to both the plurality of ZP CSI-RS configurations and the NZP CSI-RS configuration assigned to the cell 18 (Block S110). For example, with reference to FIG. 3, cell 18a is caused to transmit, within a subframe, according to ZP CSI-RS configuration IDs 3 and 8, and also to NZP CSI-RS configuration ID 8 while other cells 18b-18d are caused to transmit according to ZP CSI-RS configuration IDs 3 and 8 but according to their respective NZP CSI-RS configuration(s).

Figure 5:
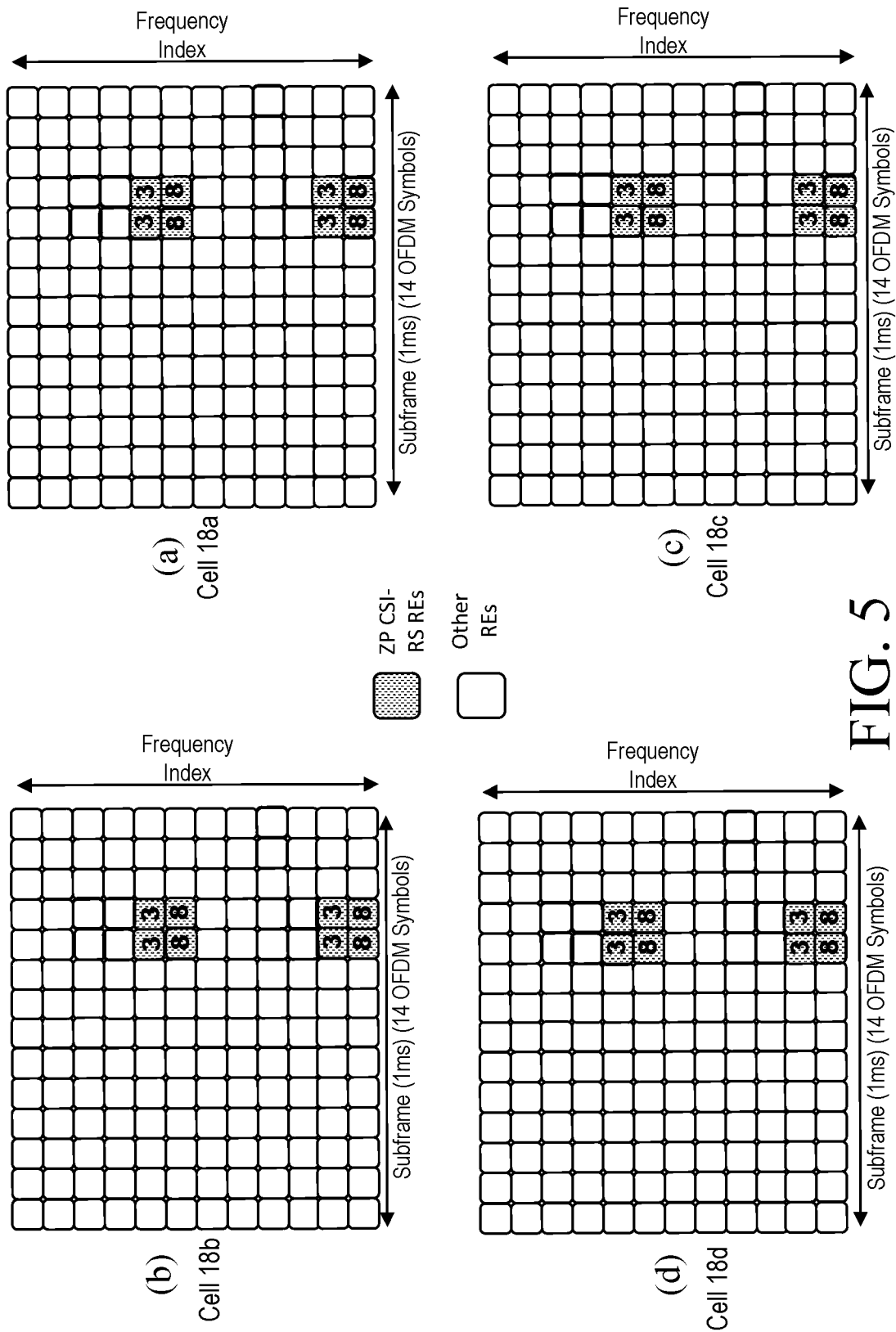
FIG. 5 is a block diagram of radio resources during the configuration process in accordance with the principles of the disclosure.

FIG. 5 illustrates radio resources during the configuration process in which ZP CSI-RS configurations have been assigned to radio resources, i.e., REs. In this example, cells 18a-18d form cluster 20 in which each cell 18 has two antennas. Therefore, as discussed above, two cells 18 are assigned a first ZP CSI-RS configuration while other two cells 18s are assigned a second ZP CSI-RS configuration as illustrated in segments (a)-(d). Each ZP CSI-RS configuration corresponds to a total amount of antennas of the two cells assigned the ZP CSI-RS configuration while the composite ZP CSI-RS configuration corresponds to the total number of antennas of cluster 20. In other words, the composite ZP CSI-RS configuration is a union of all the ZP CSI-RS configurations assigned to the cluster, as illustrated in FIGS. 3 and 5.

Figure 6:
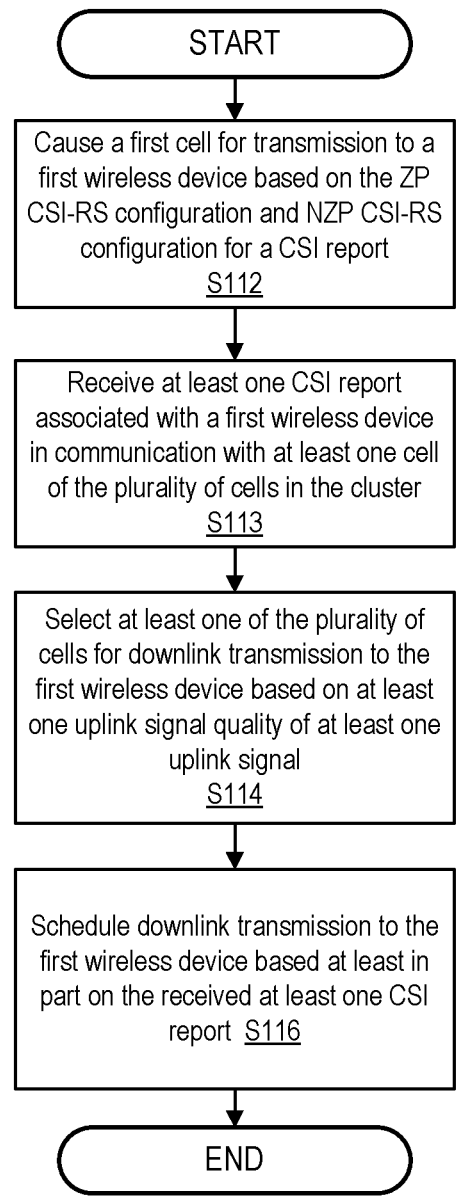
FIG. 6 is a flow diagram of an exemplary scheduling process in accordance with the principles of the disclosure.

Referring to FIG. 6, a scheduling process for scheduling downlink transmission to wireless device 14 based on CSI report(s) that are based on the CSI-RS configuration(s) and from at least one of the plurality of cells 18 is described herein. In one or more embodiments, the scheduling process is embodied as scheduling code 29. Processing circuitry 36 configures cell 18, e.g., a first cell, for transmission to wireless device 14, e.g., first wireless device, based on the ZP CSI-RS configuration and NZP CSI-RS configuration for a CSI report such that wireless device 14 sends a CSI report, as discussed above with respect to FIG. 2 (Block S112). Processing circuitry 36 receives at least one CSI report associated with the wireless device 14 in communication with at least one cell 18 of the plurality of cells 18 in cluster 20 (Block S113). For example, wireless device 14 generates at least one CSI report in response to a CSI-RS transmitted by cell 18.

Processing circuitry 36 selects at least one of the plurality of cells 18 for downlink transmission to wireless device 14 based on at least one uplink signal quality of at least one uplink signal, as discussed in detail with respect to FIGS. 8-13 (Block S114). Processing circuitry 36 schedules downlink transmission to wireless device 14 on the selected at least one of the plurality of cells 18 based on a received CSI report as discussed above with respect to FIG. 2 (Block S116). In other words, in one or more embodiments, the scheduled DL transmission to wireless device 14 is based on the configuration process of configuration code 28 and the coordination process of DPB coordination code 30, joint transmission code 32 and/or cell coordination code 34. The configuration process described herein advantageously allows RRM node 16 to receive CSI reports including RI, CQI and/or PMI such that a precoding, transmit parameters and a number of transmit layers can be determined or adjusted by RRM node 16. In one or more embodiments, precoding of the downlink transmission on the subset of the plurality of cells 18 to wireless device 14 is based on a precoder matrix indication, PMI, received in the at least one CSI report associated with first wireless device 14.

FIG. 7 illustrates an exemplary dynamic point blanking (DPB) coordination process of the disclosure. In one or more embodiments, the DPB coordination process is embodied in DPB coordination code 30. In DPB, wireless device 14 is scheduled on only one cell 18 based on the highest uplink received power from wireless device 14. Corresponding radio resources on other coordinating cells 18, which are considered to be dominant interferers, are muted. Therefore, interference may be further reduced for the surrounding coordinating cells 18. In one or more embodiments, if there is no significant interference from other coordinating cells 18, these radio resources may be reused in the coordinating cells 18.

In operation, processing circuitry 36 receives at least one uplink signal associated with wireless device 14 in communication with at least one of the plurality of cells 18 in cluster 20 (Block S118). Processing circuitry 36 determines at least one uplink signal quality of the at least one uplink signal (Block S120). For example, processing circuitry 36 determines at least one uplink signal quality of at least one uplink signal associated with the Physical Uplink Control Channel (PUCCH), the Sounding Reference Signal (SRS), the Physical Random Access Channel (PRACH) or the Physical Uplink Shared Channel (PUSCH) as measured by one or more cells 18. In one or more embodiments, the received uplink signal power on any of SRS/PUCCH/PRACH/PUSCH may be measured by one or more cells 18 of cluster 20 and reported to RRM 16. In one or more embodiments, wireless device 14's SRS/PUCCH/PRACH/PUSCH configurations are known to cells 18 of cluster 20. In one or more embodiments, the received power of the uplink signal is measured in dBm.

Processing circuitry 36 determines at least one uplink signal quality of the at least one uplink signal (Block S120). For example, processing circuitry 36 determines at least one uplink signal quality of at least one uplink signal associated with the SRS/PUCCH/PRACH/PUSCH as measured by one or more cells 18. In one or more embodiments, the received power of the uplink signal is measured in dBm. Processing circuitry 36 select cells 18 of plurality of cells 18 of cluster 20 for downlink transmission to wireless device 14 based on the determined at least one uplink signal quality of the at least one uplink signal (Block S122). Processing circuitry 36 schedules radio resources for downlink transmission to wireless device 14 on one of the selected cells 18 of plurality of cells 18 of cluster 20 while muting corresponding radio resources at the other selected cells 18 of plurality of cells 18 of cluster 20. In other words, RRM node 16 will identify serving cell 18 for downlink transmission to wireless device 14 and mute corresponding radio resources of the other selected cells 18 of cluster 20. The corresponding radio resources can be reused at the un-selected cells 18 to transmit data to other wireless device(s).

FIG. 8 illustrates an exemplary joint transmission process of the disclosure. In one or more embodiments, the joint transmission process is embodied in joint transmission code 32. In joint transmission, wireless device 14 is scheduled on one or more coordinating cells 18 on corresponding radio resources. The same information/data/signals are transmitted from these coordinating cells 18 using a different CSI-RS configuration in which the same Physical Downlink Shared Channel (PDSCH) mapping is used in for these coordinating cells 18.

Processing circuitry 36 receives at least one uplink signal associated with wireless device 14 in communication with at least one of the plurality of cells 18 in cluster 20 (Block S118). Processing circuitry 36 determines at least one uplink signal quality of the at least one uplink signal (Block S120). For example, processing circuitry 36 determines at least one uplink signal quality of at least one uplink signal associated with the Physical Uplink Control Channel (PUCCH), the Sounding Reference Signal (SRS), the Physical Random Access Channel (PRACH) or the Physical Uplink Shared Channel (PUSCH) as measured by one or more cells 18. In one or more embodiments, the received uplink signal power on any of SRS/PUCCH/PRACH/PUSCH may be measured by one or more cells 18 of cluster 20 and reported to RRM 16. Processing circuitry 36 determines at least one uplink signal quality of the at least one uplink signal (Block S120). For example, processing circuitry 36 determines at least one uplink signal quality of at least one uplink signal associated with the SRS/PUCCH/PRACH/PUSCH as measured by one or more cells 18. In one or more embodiments, the received power of the uplink signal is measured in dBm.

Processing circuitry 36 select cells 18 of the plurality of cells 18 of cluster 20 for downlink transmission to wireless device 14 based on the determined at least one uplink signal quality of the at least one uplink signal (Block S126). As discussed above, selected cells 18, i.e., coordinating cells, will transmit the same information using corresponding radio resources. Processing circuitry 36 schedules radio resources for downlink transmission to wireless device 14 on all the selected cells 18 of the plurality of cells 18 of cluster 20 (Block S128).

Figure 9:
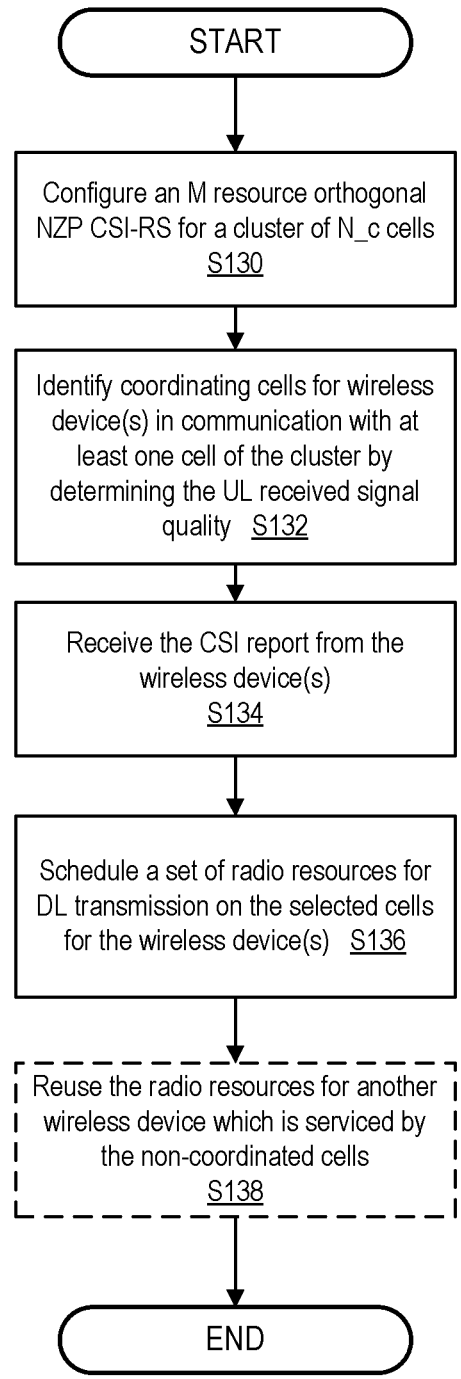
FIG. 9 is a flow diagram of an exemplary cell coordination process in accordance with the principles of the disclosure.

FIG. 9 illustrates an exemplary cell coordination process of the disclosure. In one or more embodiments, the cell coordination process is embodied in cell coordination code 34. Cell coordination code 34 is directed to configuration and determinations for scheduling radio resources for DL transmission to wireless device 14. Processing circuitry 36 configures an M resource orthogonal NZP CSI-RS for a cluster of $N\_c$ cells, each CSI-RS corresponding to the transmit antennas at each cell and partially overlapping with a composite ZP CSI-RS at cells 18, as discussed above with respect to the configuration process in FIGS. 2 and 4 (Block S130). In one embodiment the total of the antennas, N, in cluster 20 is less than or equal to eight, i.e., the total number of antennas in the M cells is less than or equal to eight. In cell coordination, downlink transmission is scheduled to wireless device 14 based on CSI report(s) triggered by the CSI-RS configuration(s) and on at least one of the plurality of cells 18. Processing circuitry 36 identifies coordinating cells 18 for one or more wireless devices 14 in communication with at least one cell 18 of cluster 20 by determining the UL received signal quality of at least one UL signal associated with wireless devices 14, as discussed above with respect to FIGS. 8 and 9 (Block S132).

Processing circuitry 36 receives CSI report from at least one wireless device 14 as discussed above with respect to FIG. 2 (Block S134). Processing circuitry 36 schedules a set of radio resources for DL transmission on the selected cells 18 for wireless device 14 using CSI reported from wireless device 14 as discussed above with respect to FIG. 6 (Block S136). In one or more embodiments, Block S134 is performed for multiple wireless devices 14 in cluster 20 that transmitted CSI report. In one or more embodiments, processing circuitry 36 reuses radio resources for another wireless device 14, in cluster 20, that is served by non-coordinated cells 18 of cluster 20, i.e., wireless device 14a is served by coordinating cells 18a and 18c of cluster 20 while wireless device 14d is served by other coordinating cell 18d of cluster 20 such that these wireless devices may be assigned corresponding radio resources (Block S138). For example, in one or more embodiments, processing circuitry 36 determines downlink radio resources of one or more of the plurality of cells 18 that are muted during transmission to wireless device 14, and schedules downlink transmission to another wireless device 14 on one or more other cells 18 of the plurality of cells 18 on the downlink radio resources that are muted. Alternatively, Block S138 may be omitted or skipped based on design need.

Figure 10:
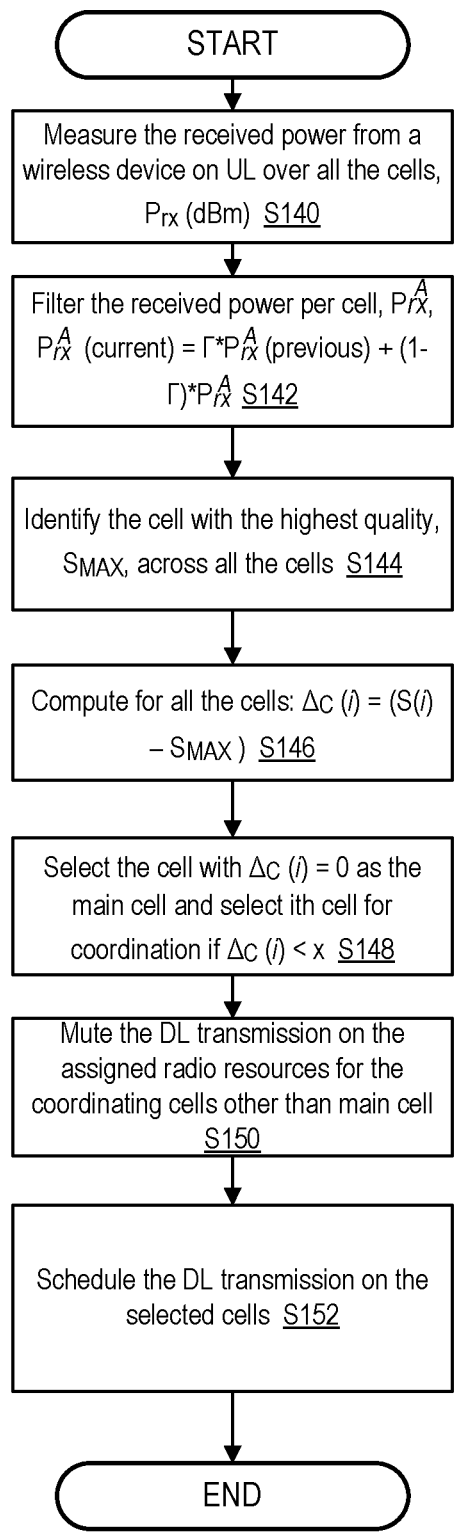
FIG. 10 is a flow diagram of another exemplary dynamic point blocking coordination process in accordance with the principles of the disclosure.

Another DPB coordination process, which may be embodied as DPB coordination code 30, is described with respect to FIG. 10. In this DPB process, wireless device 14 is scheduled on only one cell 18 based on the highest uplink received power from wireless device 14. Corresponding radio resources on other coordinating cells 18 which are considered to be dominant interferers, are muted. Therefore, interference may be further reduced for the surrounding coordinating cells 18. In one or more embodiments, if there is no significant interference from other coordinating cells 18, these radio resources may be reused in the coordinating cells 18.

Processing circuitry 36 measures the received power, $P_{rx}$ (dBm) from wireless device 14 on the UL at cell 18 in cluster 20 (Block S140). In one or more embodiments, the received power is from at least one uplink signal of wireless device 14 in which the at least one uplink signal is associated with the SRS, PUCCH, PRACH and/or PUSCH as measured by one or more cells 18. Processing circuitry 36 filters the received power per cell (Block S142). In one or more embodiments, the filtered power per cell, $P_{rx}^A$ (dBm) is determined using the following equation: $P_{rx}^A$(current) $=\Gamma*P_{rx}^A$(previous)$+(1-\Gamma)*P_{rx}^A$, where $\Gamma$ is a filtering parameter that ranges between zero and one. The function of filtering of the received power may be performed either in the linear domain or dBm domain.

Processing circuitry 36 identifies the sector or cell with the highest received power, $S_{MAX}$, across all the cells 18 in cluster 20 (Block S144). Processing circuitry 36 computes the received power offset, $\Delta_C$ (i) (dBm), for all the cells i with respect to the cell with maximum power: $\Delta_C$(i)=(S(i)–$S_{MAX}$) (Block S146). In particular, $$S(i)=P_{rx}^A(i)+P_{tx}(i)$$

where $P_{rx}^A$(i) is the average receive power per RE or PRB of PUCCH/PRACH/SRS/PUSCH for cell-i, and $P_{tx}$(i) is the transmit power per RE or PRB for PDSCH for cell-i. Processing circuitry 36 selects cell 18 with $\Delta_C$ (i)=0 as the main cell 18 and selects ith cell(s) 18 for coordination if $\Delta_C$(i)<x (Block S148). In particular, x is a threshold in dB for deciding other cells for coordination in which x is selected such that the coordination gain is maximized without wasting radio resources at the coordinating cells. The main cell 18 and selected cell(s) 18 form the coordinating cells 18 of cluster 20 for a specific wireless device 14. In other words, cell 18 with the highest metric (i), $S_{MAX}$ from wireless device 14 is the serving cell 18 for wireless device 14.

Processing circuitry 36 mutes DL transmission on radio resources assigned to coordinating cells 18 (Block S150). In one or more embodiments, cells 18, other than serving cell 18 of cluster 20, with metric S(i) within xdB are considered dominant interferers and the radio resources used to transmit DL information/data/signals from selected serving cell 18 to wireless device 14 are muted on these other cells 18. In one or more embodiments, all other cells 18 in cluster 20, i.e., the cells for which the metric S(i) are more than x dB below the $S_{MAX}$ are considered candidates for radio resource reuse. Processing circuitry 32 schedules the DL transmission on selected cells 13 as described in Block S136 and precodes the data from serving cell 18 based on CSI (Block S152). In one or more embodiments, precoding of the downlink transmission on serving cell 18 to wireless device 14 is based on a precoder matrix indication, PMI, received in the at least one CSI report associated with wireless device 14.

Figure 11:
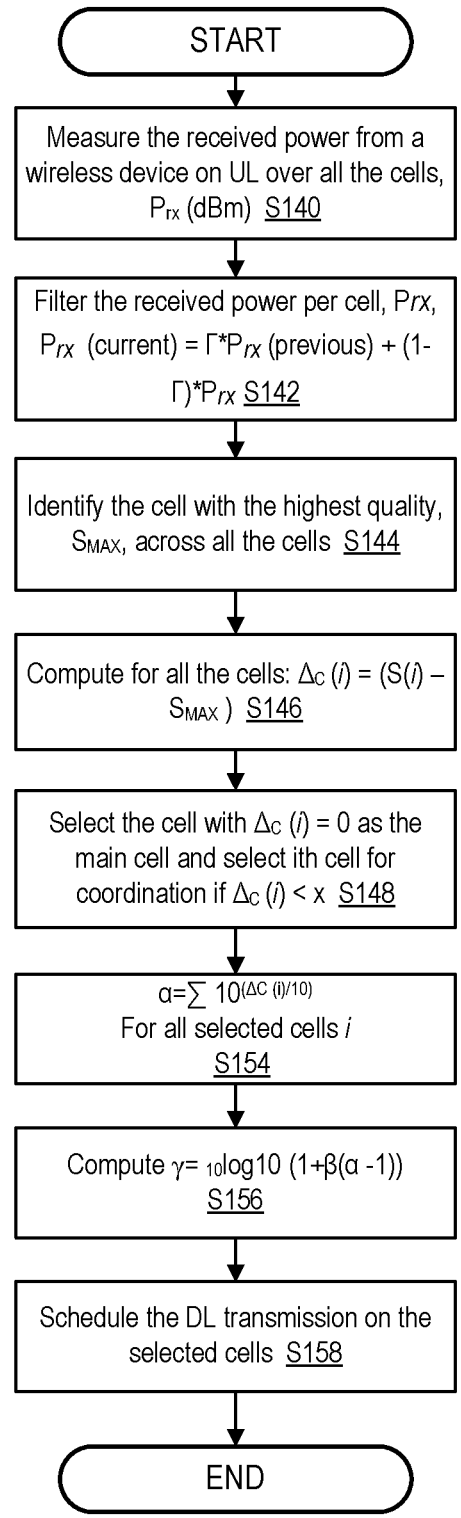
FIG. 11 is a flow diagram of another exemplary joint transmission process in accordance with the principles of the disclosure.

FIG. 11 illustrates another joint transmission process of the disclosure, which may be embodied in joint transmission code 32. Blocks S140-S148 are described above with respect to FIG. 10. For example, cell 18 with the highest metric (i), $S_{max}$ from wireless device 14 is considered to be the serving cell 18 for the wireless device 14. All other cell 18 of cluster 20 with S(i) within xdB is considered a potential coordinating cell 18, and radio resources used to transmit DL information from the selected serving cell to wireless device 14 are used to transmit the same information to wireless devices 14 from these coordinating cells 18. All other cells 18 in cluster 20 for which the metric S(i) is more than x dB below $S_{max}$ are considered candidates for radio resource reuse.

Processing circuitry 36 calculates a for all selected cells i (Block S154). In one or more embodiments, the equation for determining $\alpha$ is $$\alpha = \sum_i 10^{\frac{\Delta_C(i)}{10}},$$

where $\Delta_C$ (i) is the received power offset as discussed above, with respect to FIG. 11. Processing circuitry 36 computes correction factor $\gamma$ (Block S156). In one or more embodiments, the equation for determining a correction factor, $\gamma$, is $\gamma=_{10}$ log 10 (1+$\beta(\alpha-1)$), where $\alpha$ was calculated in Block S154. In the above description, $\alpha$ represents the sum of differential receive powers of all selected coordinating cells 18 in linear scale (including the cell 18 which the maximum receive power $S_{MAX}$). The differential power levels, $\Delta_C$, of each cell 18 is measured as the received power at that cell 18 compared to the maximum receive power level among all the selected coordinating cells 18. A power correction factor $\gamma$ with respect to the maximum receive power is computed as described above. A scale parameter, $\beta$, whose value is set between 0 and 1, is used to scale the sum of difference powers. The scaling factor is applied only on the sum of differential powers including cells 18 whose receive powers are less than the maximum receive power. Processing circuitry 36 schedules the DL transmission on the selected cells as discussed above with respect to Block S128 (Block S158). In one or more embodiments, processing circuitry 36 applies the correction factor γ for link adaptation.

Figure 12:
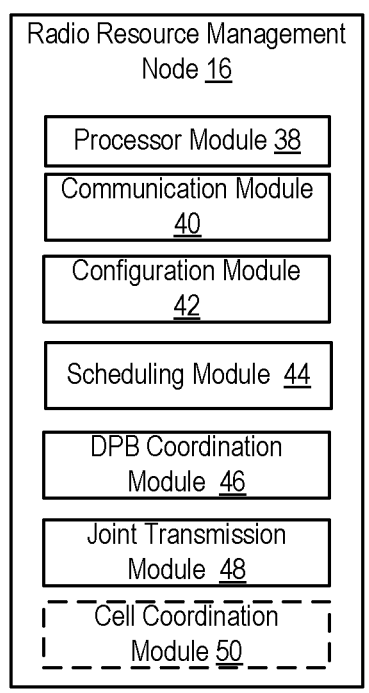
FIG. 12 is a block diagram of another exemplary radio resource management (RRM) node in accordance with the principles of the disclosure.

Referring to FIG. 12, another exemplary RRM node 16 is illustrated. RRM node 16 includes processor module 38 for performing RRM node 16 functions described herein with respect to processing circuitry 36. RRM node 16 includes communication module 40 for performing communications functions described herein with respect to communication interface 18. Further, RRM node 16 includes configuration module 42 for performing the configuration process described in detail with respect to configuration code 28. RRM node 16 includes scheduling module 44 for performing the scheduling process described in detail with respect to scheduling code 29. RRM node 16 further includes DPB coordination module 46 for performing the coordination process described in detail with respect to DPB coordination code 46. RRM node 16 further includes joint transmission module 48 for performing the joint transmission process described in detail with respect to joint transmission code 32. RRM node 16 further includes cell coordination module 50 for performing the cell coordination process described in detail with respect to cell coordination code 34.

Figure 13:
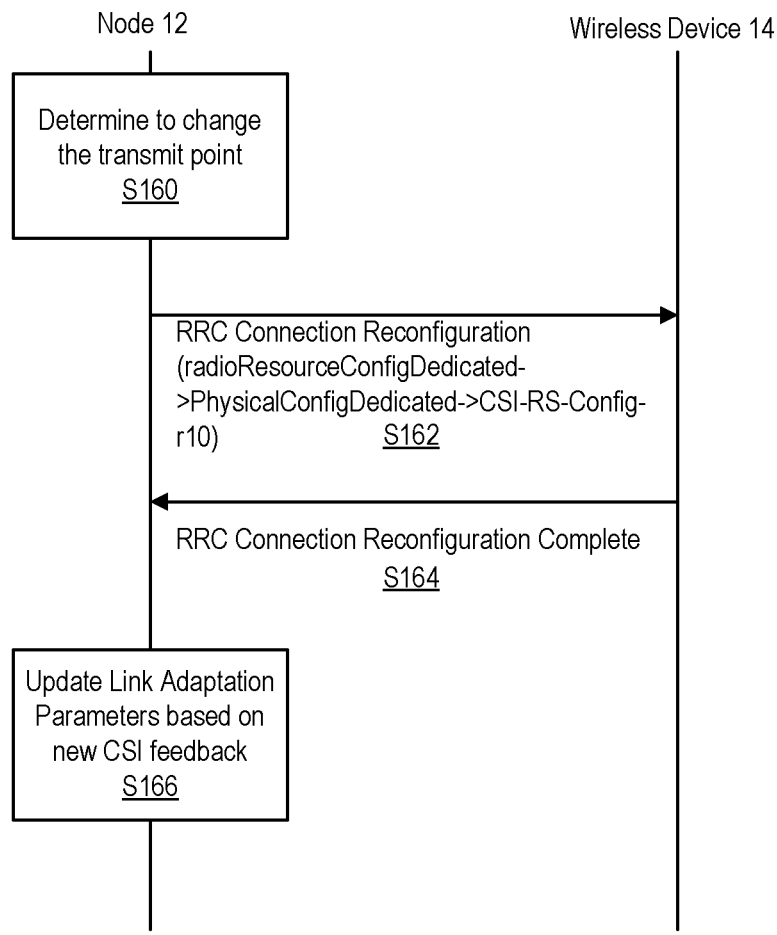
FIG. 13 is a signaling diagram of an exemplary radio resource control process in accordance with the principles of the disclosure.

A process for radio resource control (RRC) signaling during transition of wireless device 14 between cells 18 of different coordinating cells 18 is described with respect to FIG. 13. In particular, during the transition between cells 18, an RRC connection reconfiguration message is transmitted to wireless device 14 to indicate a change in the CSI-RS configuration. In other words, when wireless device 14 moves between cells 18, during the cell transition, RRC Connection Reconfiguration message is sent to wireless device 14 to inform the CSI-RS NZP resources for the target coordinating cell 18.

Node 12 determines to change coordinating cell 18, i.e., transmit point, such as based on signal quality (Block S160). Node 12 causes an RRC connection reconfiguration message to be transmitted to wireless device 14 in order to notify wireless device 14 of the transition (Block S162). Wireless device 14 responds to the RRC connection reconfiguration message by sending an RRC connection reconfiguration complete message (Block S164). Node 12 updates the link adaption parameters based on new CSI feedback, i.e., new CSI report (Block S166). The above described procedure advantageously prevents unnecessary handovers between cells 18. Serving cell 18 can be kept the same, however, the cell 18 which is preferred for DL transmission can be changed without triggering handover. In one or more embodiments, this is accomplished at least in part by keeping the cell ID of all cells 18 within cluster 20 the same. When wireless device 14 moves between cell 18, CSI is measured based on the current cell's CSI-RS configuration, which is indicated to wireless device 14 in a RRC connection reconfiguration as described above.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claim is:

1. A node for managing cell coordination, comprising:
    processing circuitry, the processing circuitry including a processor, and a memory, the memory containing instructions that, when executed by the processor, configure the processor to:
        determine a cluster of a plurality of cells, the cluster of the plurality of cells having a plurality of antennas;
        assign at least one zero power channel state information reference signal (ZP CSI-RS) configuration to each of the plurality of cells of the cluster;
        assign each cell in the plurality of cells of the cluster a respective non-zero power channel state information reference signal (NZP CSI-RS) configuration, the NZP CSI-RS configuration assigned to each cell in the plurality of cells in the cluster partially overlapping the at least one ZP CSI-RS configuration assigned to each cell in the plurality of cells in the cluster;
        cause a first cell of the plurality of cells of the cluster to transmit, within a subframe, based on the at least one ZP CSI-RS configuration and the NZP CSI-RS configuration assigned to the first cell;
        receive at least one channel state information (CSI) report associated with a first wireless device in communication with at least one cell of the plurality of cells in the cluster, the at least one CSI report being based at least in part on the transmission according to the at least one ZP CSI-RS configuration and the NZP CSI-RS configuration assigned to the first cell;
        schedule radio resources for downlink transmission to the first wireless device based at least in part on the received at least one CSI report;
        receive at least one uplink signal associated with the first wireless device in communication with at least one of the plurality of cells in the cluster;
        determine at least one uplink signal quality of the at least one uplink signal;
        select cells of the plurality of cells of the cluster for downlink transmission to the first wireless device based on the determined at least one uplink signal quality of the at least one uplink signal; and
        the scheduling of radio resources for downlink transmission to the first wireless device includes scheduling of radio resources on all the selected cells of the plurality of cells of the cluster.

2. The node of claim 1, wherein the at least one ZP CSI-RS configuration is a plurality of ZP CSI-RS configurations, each of the plurality of ZP CSI-RS configurations corresponding to a total number of antennas every N cells of the cluster, where N is not greater than two.

3. The node of claim 1, wherein the respective NZP CSI-RS configurations are determined based on a number of antennas of the respective cell being assigned the NZP CSI-RS configuration.

4. The node of claim 1, wherein radio resources assigned to the respective NZP CSI-RS configurations do not overlap each other.

5. The node of claim 1, wherein a composite NZP CSI-RS configuration of each of the respective NZP CSI-RS configurations of the plurality of cells of the cluster corresponds to the total number of antennas of the cluster.

6. The node of claim 1, wherein at least one of the at least one ZP CSI-RS is selected for assignment at random from a plurality of ZP CSI-RS configurations.

7. The node of claim 1, wherein the memory contains further instructions that, when executed by the processor, configure the processor to:
    receive at least one uplink signal associated with the first wireless device in communication with at least one of the plurality of cells in the cluster;
    determine at least one uplink signal quality of the at least one uplink signal;
    select cells of the plurality of cells of the cluster for downlink transmission to the first wireless device based on the determined at least one uplink signal quality of the at least one uplink signal; and
    the scheduling of radio resources for downlink transmission to the first wireless device includes scheduling of radio resources on one of the selected cells of the plurality of cells of the cluster while muting corresponding radio resources at the other selected cells of the plurality of cells of the cluster.

8. A method for managing cell coordination, comprising:
    determining a cluster of a plurality of cells, the cluster of the plurality of cells having a plurality of antennas;
    assigning at least one zero power channel state information reference signal (ZP CSI-RS) configuration to each of the plurality of cells of the cluster;
    assigning to each cell in the plurality of cells of the cluster a respective non-zero power channel state information reference signal (NZP CSI-RS) configuration, the NZP CSI-RS configuration assigned to each cell in the plurality of cells in the cluster partially overlapping the at least one ZP CSI-RS configuration assigned to each cell in the plurality of cells in the cluster;
    causing a first cell of the plurality of cells of the cluster to transmit, within a subframe, based on the at least one ZP CSI-RS configuration and the NZP CSI-RS configuration assigned to the first cell;
    receiving at least one channel state information (CSI) report associated with a first wireless device in communication with at least one cell of the plurality of cells in the cluster, the at least one CSI report being based at least in part on the transmission according to the at least one ZP CSI-RS configuration and the NZP CSI-RS configuration assigned to the first cell;
    scheduling radio resources for downlink transmission to the first wireless device based at least in part on the received at least one CSI report
    receiving at least one uplink signal associated with the first wireless device in communication with at least one of the plurality of cells in the cluster;
    determining at least one uplink signal quality of the at least one uplink signal;
    selecting cells of the plurality of cells of the cluster for downlink transmission to the first wireless device based on the determined at least one uplink signal quality of the at least one uplink signal; and the scheduling of radio resources for downlink transmission to the first wireless device includes scheduling of radio resources on all the selected cells of the plurality of cells of the cluster.

9. The method of claim 8, wherein the at least one ZP CSI-RS configuration is a plurality of ZP CSI-RS configurations, each of the plurality of ZP CSI-RS configurations corresponding to a total number of antennas every N cells of the cluster, where N is not greater than two.

10. The method of claim 8, wherein the respective NZP CSI-RS configurations are determined based on a number of antennas of the respective cell being assigned the NZP CSI-RS configuration.

11. The method of claim 8, wherein radio resources assigned to the respective NZP CSI-RS configurations do not overlap each other.

12. The method of claim 8, wherein a composite NZP CSI-RS configuration of each of the respective NZP CSI-RS configurations of the plurality of cells of the cluster corresponds to the total number of antennas of the cluster.

13. The method of claim 8, wherein at least one of the at least one ZP CSI-RS configuration is selected for assignment at random from a plurality of ZP CSI-RS configurations.

14. The method of claim 8, further comprising:
receiving at least one uplink signal associated with the first wireless device in communication with at least one of the plurality of cells in the cluster;
determining at least one uplink signal quality of the at least one uplink signal;
selecting cells of the plurality of cells of the cluster for downlink transmission to the first wireless device based on the determined at least one uplink signal quality of the at least one uplink signal; and
the scheduling of radio resources for downlink transmission to the first wireless device includes scheduling of radio resources on one of the selected cells of the plurality of cells of the cluster while muting corresponding radio resources at the other selected cells of the plurality of cells of the cluster.

15. A node for managing cell coordination, comprising:
processing circuitry, the processing circuitry including a processor, and a memory, the memory containing instructions that, when executed by the processor, configure the processor to:
cause a first cell of a plurality of cells of a cluster to transmit, within a subframe, based on a zero power channel state information reference signal (ZP CSI-RS) configuration and a non-zero power channel state information reference signal (NZP CSI-RS) configuration that is assigned to the first cell, the NZP CSI-RS configuration assigned to the first cell in the plurality of cells in the cluster partially overlapping the at least one ZP CSI-RS configuration assigned to the first cell in the plurality of cells in the cluster;
receive at least one channel state information (CSI) report associated with a first wireless device in communication with at least one cell of the plurality of cells of the cluster, the at least one CSI report being based at least in part on the transmission based on the ZP CSI-RS configuration and NZP CSI-RS configuration;
schedule radio resources for downlink transmission to the first wireless device based at least in part on the received at least one CSI report;

receive at least one uplink signal associated with the first wireless device in communication with at least one of the plurality of cells in the cluster;
determine at least one uplink signal quality of the at least one uplink signal;
select cells of the plurality of cells of the cluster for downlink transmission to the first wireless device based on the determined at least one uplink signal quality of the at least one uplink signal; and
the scheduling of radio resources for downlink transmission to the first wireless device includes scheduling of radio resources on all the selected cells of the plurality of cells of the cluster.

16. The node of claim 15 wherein the memory contains further instructions that, when executed by the processor, configure the processor to:
receive at least one uplink signal associated with the first wireless device in communication with at least one of the plurality of cells in the cluster;
determine at least one uplink signal quality of the at least one uplink signal;
select cells of the plurality of cells of the cluster for downlink transmission to the first wireless device based on the determined at least one uplink signal quality of the at least one uplink signal; and
the scheduling of radio resources for downlink transmission to the first wireless device includes scheduling of radio resources on one of the selected cells of the plurality of cells of the cluster while muting corresponding radio resources at the other selected cells of the plurality of cells of the cluster.

17. A method for managing cell coordination, comprising:
causing a first cell of a plurality of cells of a cluster to transmit, within a subframe, based on a zero power channel state information reference signal (ZP CSI-RS) configuration and a non-zero power channel state information reference signal (NZP CSI-RS) configuration that is assigned to the first cell, the NZP CSI-RS configuration assigned to the first cell in the plurality of cells in the cluster partially overlapping the at least one ZP CSI-RS configuration assigned to the first cell in the plurality of cells in the cluster;
receiving at least one channel state information (CSI) report associated with a first wireless device in communication with at least one cell of the plurality of cells of the cluster, the at least one CSI report being based at least in part on the transmission based on the ZP CSI-RS configuration and NZP CSI-RS configuration;
scheduling radio resources for downlink transmission to the first wireless device based at least in part on the received at least one CSI report;
receiving at least one uplink signal associated with the first wireless device in communication with at least one of the plurality of cells in the cluster;
determining at least one uplink signal quality of the at least one uplink signal;
selecting cells of the plurality of cells of the cluster for downlink transmission to the first wireless device based on the determined at least one uplink signal quality of the at least one uplink signal; and
the scheduling of radio resources for downlink transmission to the first wireless device includes scheduling of radio resources on all the selected cells of the plurality of cells of the cluster.

18. The method of claim 17, further comprising:
- receiving at least one uplink signal associated with the first wireless device in communication with at least one of the plurality of cells in the cluster;
- determining at least one uplink signal quality of the at least one uplink signal;
- selecting cells of the plurality of cells of the cluster for downlink transmission to the first wireless device based on the determined at least one uplink signal quality of the at least one uplink signal; and
- the scheduling of radio resources for downlink transmission to the first wireless device includes scheduling of radio resources on one of the selected cells of the plurality of cells of the cluster while muting corresponding radio resources at the other selected cells of the plurality of cells of the cluster.

* * * * *